United States Patent
Shelksohn et al.

(10) Patent No.: US 11,842,384 B2
(45) Date of Patent: *Dec. 12, 2023

(54) DIGITAL MODEL OPTIMIZATION RESPONSIVE TO ORIENTATION SENSOR DATA

(71) Applicant: eBay Inc., San Jose, CA (US)

(72) Inventors: Marcus Shelksohn, San Jose, CA (US); Fernando Villarreal, San Jose, CA (US); Khashayar Dehdashtinejad, San Jose, CA (US); Matthew Wolf, San Jose, CA (US); Jordan Springstroh, San Jose, CA (US); Jonathan Zhang, San Jose, CA (US); Yuquan Yang, San Jose, CA (US); Xiaoming Zhang, San Jose, CA (US); Zoran Dukic, San Jose, CA (US)

(73) Assignee: EBAY INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/516,781

(22) Filed: Nov. 2, 2021

(65) Prior Publication Data

US 2022/0058724 A1    Feb. 24, 2022

Related U.S. Application Data

(63) Continuation of application No. 17/007,564, filed on Aug. 31, 2020, now Pat. No. 11,188,975, which is a
(Continued)

(51) Int. Cl.
G06Q 30/0601 (2023.01)
G06F 3/01 (2006.01)
(Continued)

(52) U.S. Cl.
CPC ......... *G06Q 30/0643* (2013.01); *G06F 3/012* (2013.01); *G06F 3/0346* (2013.01);
(Continued)

(58) Field of Classification Search
CPC .. G06Q 30/0643; G06Q 10/02; G06F 3/0346; G06F 3/012; G06F 3/04817; G06F 16/00; G06T 15/205; G06T 2200/16; G06T 11/60
See application file for complete search history.

(56) References Cited

U.S. PATENT DOCUMENTS 8,314,789 B2   11/2012   Fitzmaurice et al.
10,223,741 B2   3/2019   Shelksohn et al.
(Continued)

FOREIGN PATENT DOCUMENTS

CN   104081389   10/2014
WO   2017/173153 A1   10/2017

OTHER PUBLICATIONS

U.S. Appl. No. 15/474,964 U.S. Pat. No. 10,223,741, filed Mar. 30, 2017, Digital Model Optimization Responsive to Orientation Sensor Data.
(Continued)

*Primary Examiner* — Phi Hoang
(74) *Attorney, Agent, or Firm* — SCHWEGMAN LUNDBERG & WOESSNER, P.A.

(57) ABSTRACT

A system server includes a database of two-dimensional images and a processor coupled to a hardware memory with instructions that in response to execution by the processor direct performance of operations. The operations include generating a digital model from the images in the database and communicating a first portion of the digital model as an enhanced view to a user device. The first portion corresponds to a first line of sight orientation of the user device
(Continued)

as measured by an orientation sensor. The operations include receiving a signal based on sensor data measured by the orientation sensor. The signal indicates movement of the user device from the first line of sight orientation to a second line of sight orientation. In response, the method includes communicating a second portion of the digital model to the user device that corresponds to the second line of sight orientation of the user device.

18 Claims, 19 Drawing Sheets

Related U.S. Application Data continuation of application No. 16/293,547, filed on Mar. 5, 2019, now Pat. No. 10,796,360, which is a continuation of application No. 15/474,964, filed on Mar. 30, 2017, now Pat. No. 10,223,741.

(60) Provisional application No. 62/315,492, filed on Mar. 30, 2016.

(51) Int. Cl.
    *G06F 16/00* (2019.01)
    *G06F 3/0346* (2013.01)
    *G06F 3/04817* (2022.01)
    *G06Q 10/02* (2012.01)
    *G06T 11/60* (2006.01)
    *G06T 15/20* (2011.01)

(52) U.S. Cl.
    CPC .......... *G06F 3/04817* (2013.01); *G06F 16/00* (2019.01); *G06Q 10/02* (2013.01); *G06T 11/60* (2013.01); *G06T 15/205* (2013.01); *G06T 2200/16* (2013.01)

(56) References Cited

U.S. PATENT DOCUMENTS

| | | | |
|---|---|---|---|
| 10,796,360 B2 | 10/2020 | Shelksohn et al. | |
| 11,188,975 B2 | 11/2021 | Shelksohn et al. | |
| 2006/0271292 A1 | 11/2006 | Buck | |
| 2007/0253908 A1 | 11/2007 | Rice et al. | |
| 2009/0063206 A1* | 3/2009 | Payne | G06Q 30/0601 705/26.1 |
| 2009/0079730 A1 | 3/2009 | Lee et al. | |
| 2010/0020072 A1 | 1/2010 | Mohammed et al. | |
| 2010/0246605 A1* | 9/2010 | Taylor | H04N 21/44012 370/477 |
| 2012/0099804 A1 | 4/2012 | Aguilera et al. | |
| 2013/0268899 A1* | 10/2013 | Valentino | G06Q 10/02 715/852 |
| 2014/0089850 A1 | 3/2014 | Gorstan et al. | |
| 2014/0095223 A1 | 4/2014 | Oxenham et al. | |
| 2014/0207774 A1 | 7/2014 | Walter et al. | |
| 2015/0227969 A1* | 8/2015 | Hanly | G06Q 30/0252 705/14.5 |
| 2015/0242888 A1* | 8/2015 | Zises | G06Q 30/0252 705/14.5 |
| 2015/0324851 A1 | 11/2015 | Campbell et al. | |
| 2015/0352437 A1 | 12/2015 | Koseki et al. | |
| 2015/0358539 A1 | 12/2015 | Catt | |
| 2016/0073013 A1 | 3/2016 | Prosserman et al. | |
| 2016/0189062 A1* | 6/2016 | Forss | G06Q 10/02 705/5 |
| 2016/0262162 A1 | 9/2016 | Calin et al. | |
| 2017/0011398 A1* | 1/2017 | Narasimhan | G06Q 20/108 |
| 2017/0115488 A1 | 4/2017 | Ambrus et al. | |
| 2017/0163591 A1* | 6/2017 | Jimenez Pazmino | H04L 67/1095 |
| 2017/0270587 A1* | 9/2017 | Wolfson | G06Q 10/02 |
| 2017/0280133 A1 | 9/2017 | Niemeläet al. | |
| 2017/0287059 A1 | 10/2017 | Shelksohn et al. | |
| 2019/0197607 A1 | 6/2019 | Shelksohn et al. | |
| 2021/0049676 A1 | 2/2021 | Shelksohn et al. | |

OTHER PUBLICATIONS

U.S. Appl. No. 16/293,547 U.S. Pat. No. 10,796,360, filed Mar. 5, 2019, Digital Model Optimization Responsive to Orientation Sensor Data.
U.S. Appl. No. 17/007,564 U.S. Pat. No. 11,188,975, filed Aug. 31, 2020, Digital Model Optimization Responsive to Orientation Sensor Data.
Non-Final Office Action received for U.S. Appl. No. 15/474,964, dated Feb. 14, 2018, 16 pages.
Notice of Allowance received for U.S. Appl. No. 15/474,964, dated Jun. 28, 2018, 8 pages.
Notice of Allowance received for U.S. Appl. No. 15/474,964, dated Nov. 1, 2018, 9 pages.
Non Final Office Action Received for U.S. Appl. No. 16/293,547, dated May 14, 2020, 9 Pages.
Notice of Allowance received for U.S. Appl. No. 16/293,547, dated Jul. 8, 2020, 7 pages.
Corrected Notice of Allowability Received for U.S. Appl. No. 17/007,564, dated Nov. 5, 2021, 2 Pages.
Non Final Office Action Received for U.S. Appl. No. 17/007,564, dated Apr. 13, 2021, 10 pages.
Notice of Allowance Received for U.S. Appl. No. 17/007,564, dated Jul. 30, 2021, 9 Pages.
Communication Pursuant to Article 94(3) EPC received for European Patent Application No. 17776699.5, dated Aug. 27, 2021, 10 pages.
Extended European Search Report received for European Patent Application No. 17776699.5 dated Sep. 16, 2019, 10 pages.
International Preliminary Report on Patentability received for PCT Patent Application No. PCT/US2017/025158, dated Oct. 11, 2018, 10 pages.
International Search Report received for PCT Patent Application No. PCT/US2017/025158, dated Jun. 21, 2017, 2 pages.
Written Opinion received for PCT Patent Application No. PCT/US2017/025158, dated Jun. 21, 2017, 8 pages.
Wikipedia,"Augmented Reality", Retrieved from the Internet: URL: https://en.wikipedia.org/w/index.php?title=Augmented%20reality&oldid=710844601, Mar. 19, 2016, 21 Pages.
Wikipedia,"Image Stitching", Retrieved from the Internet URL: https://en.wikipedia.org/w/index.php?title=Image%20stitching&oldid=693727653, Dec. 4, 2015, 5 pages.
"Chinese Application Serial No. 201780030811.8, Office Action dated Feb. 5, 2023", w English Translation, 20 pgs.
"Chinese Application Serial No. 201780030811.8, Office Action dated Mar. 22, 2023", With English machine translation, 44 pgs.

\* cited by examiner

DIGITAL MODEL OPTIMIZATION RESPONSIVE TO ORIENTATION SENSOR DATA

RELATED APPLICATION

This application is a continuation of U.S. patent application Ser. No. 17/007,564, filed Aug. 31, 2020, which is a continuation of U.S. patent application Ser. No. 16/293,547, filed Mar. 5, 2019, now U.S. Pat. No. 10,796,360, issued on Oct. 6, 2020; which is a continuation of U.S. patent application Ser. No. 15/474,964, filed on Mar. 30, 2017, now U.S. Pat. No. 10,223,741, issued on Mar. 5, 2019; which claims the benefit of and priority to U.S. Provisional Application No. 62/315,492 filed Mar. 30, 2016; each of which is hereby incorporated by reference in its entirety.

FIELD

The embodiments discussed herein are related to digital model optimization responsive to orientation sensor data.

BACKGROUND

Ticket marketplace websites provide users the ability to exchange tickets for events. The tickets are used to reserve seats and/or admission for events, such as sporting events, concerts, theater events, and other entertainment events. On some of the websites, a user searches for available tickets and decides which, if any, of the available tickets are of interest to the user and have the best value. To allow a user to make an informed decision on which tickets to obtain, the ticket marketplace website may provide information about venues in which the events are taking place.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect, an embodiment may include a system server that may include a database of two-dimensional images and one or more processors coupled to a hardware memory with instructions that in response to execution by the one or more processors direct performance of operations. The operations may include generating a digital model from the images in the database. The operations may include communicating a first portion of the digital model as an enhanced view to the user device. The first portion may correspond to a first line of sight orientation of the user device as measured by the orientation sensor. The operations may include receiving a signal based on sensor data measured by the orientation sensor. The signal may indicate movement of the user device from the first line of sight orientation to a second line of sight orientation. In response to receipt of the signal, the operations may include communicating a second portion of the digital model to the user device that corresponds to the second line of sight orientation of the user device.

According to another aspect, an embodiment may include a system configured for digital model optimization. The system may include a user device and a system server. The user device may include a display device and an orientation sensor. The system server may include a database of two-dimensional images and one or more processors coupled to a hardware memory with instructions that in response to execution by the one or more processors direct performance of operations. The operations may include generating a digital model from the images in the database. The operations may include communicating a first portion of the digital model as an enhanced view to the user device. The first portion may correspond to a first line of sight orientation of the user device as measured by the orientation sensor. The operations may include receiving a signal based on sensor data measured by the orientation sensor. The signal may indicate movement of the user device from the first line of sight orientation to a second line of sight orientation. In response to receipt of the signal, the operations may include communicating a second portion of the digital model to the user device that corresponds to the second line of sight orientation of the user device.

According to yet another aspect, an embodiment may include a method of digital model optimization. The method may include generating a digital model based on a plurality of two-dimensional images. The method may include communicating a first portion of the digital model as an enhanced view to the user device. The first portion may correspond to a first line of sight orientation of the user device as measured by an orientation sensor. The method may include receiving a signal based on sensor data measured by the orientation sensor. The signal may indicate movement of the user device from the first line of sight orientation to a second line of sight orientation. In response to receipt of the signal, the method may include communicating a second portion of the digital model to the user device that corresponds to the second line of sight orientation of the user device.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
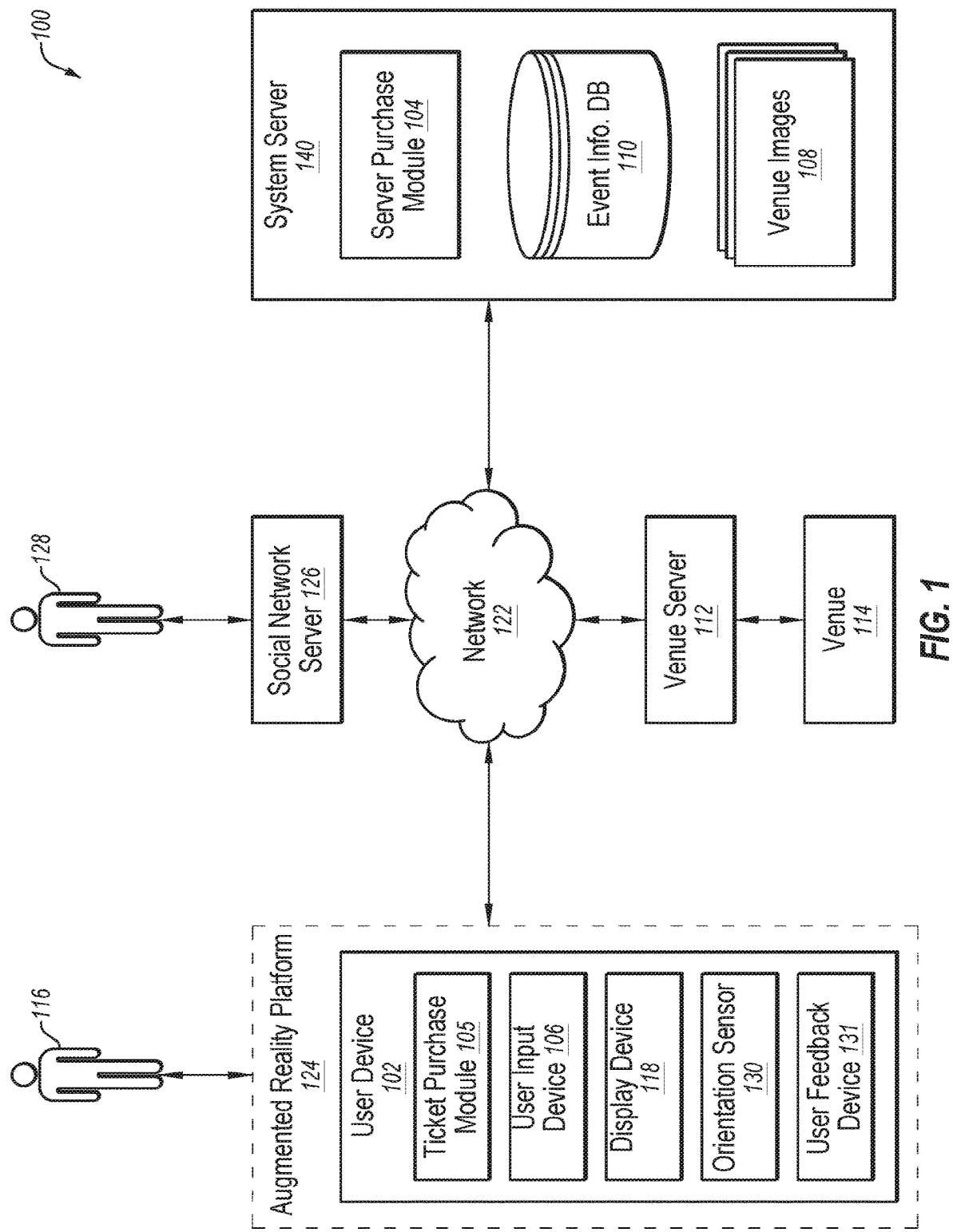
FIG. 1 illustrates an example operating environment in which some embodiments may be implemented.

In some existing online ticket marketplaces, ticket marketplace servers and marketplace applications on user devices provide a limited set of information to users. In addition, the information provided to the users is generally static and impersonal. For instance, a buyer in an online ticket marketplace may view a general layout of a venue, the seating sections included in the venue, available tickets, and a ticket price. The user decides whether to purchase a ticket based on this limited set of information. The buyer may regret their purchase when they arrive at the venue. For example, the buyer may find that the view from the seat is obstructed or their friends all purchased seats in another section.

Reasons for the limited set of information include an unavailability of three-dimensional models of the venues. For example, computer-aided design (CAD) models for the venues are generally not available. Similarly, photographs of the venue may include two-dimensional images. Embodiments discussed in the present disclosure are related to digital models for venues that are responsive to device orientation. In particular, in some embodiments, the digital models may be used for enhanced seat views in an online ticket marketplace. Embodiments described in the present disclosure address the technological problem of the limited information provided in online ticket marketplaces. For example, in some embodiments, enhanced seat views are provided to a buyer or another individual interacting with the online ticket marketplace. The enhanced seat view may be based on three-dimensional digital models of the venue. The three-dimensional digital models may be based on multiple two-dimensional images taken in different directions that are stitched together around a higher resolution sphere or projected into the corresponding faces of a cube.

In the online ticket marketplace, the enhanced seat view may be communicated to a user device by a system server. The enhanced seat view includes a 360-degree interactive view from a selected seating section or seat. The portion of the enhanced seat view displayed to the user is responsive to movement of the user device and a line of sight orientation of the user device from the selected seating section. Additionally, an overlay may be generated that is overlaid on the enhanced seat view. The overlay may include icons that represent an available seat, an associate of the user who is also attending an event, a relocation icon, etc. The icons in the overlay are displayed in response to the user device being oriented such that the portion of the enhanced seat view that includes the informational overlay corresponds to a line of sight orientation of the user device. The icons may be updated as seats become available, prices for seats change, associates purchase tickets, etc. Thus, embodiments of the present disclosure address the technological limitations present in online ticket marketplaces. For instance, embodiments of the present disclosure provide enhanced seat views that may include informational overlays that are updatable and personalized.

Some example embodiments are described in this disclosure with reference to the appended figures. In the figures, features with like item numbers indicate similar structure and similar functionality unless described otherwise.

FIG. 1 illustrates an example operating environment 100 in which an online ticket marketplace (hereinafter, "marketplace") may be implemented. In the operating environment 100, a user 116 may interact with their user device 102 to search for and/or obtain tickets, which may be listed on a site that is hosted or controlled by a system server 140. The tickets may be for an event that occurs at a venue 114. As the user 116 interacts with the user device 102, an enhanced seat view may be provided to a user device 102 from a system server 140 via a network 122. The enhanced seat view may depict a seat view from a particular location in the venue 114. The enhanced seat view may be a 360-degree image that is responsive to orientation of the user device 102. As used in this disclosure, the term "360-degree image" includes image data from vertical viewing angles and horizontal viewing angles greater than about 300 degrees for a particular point.

The operating environment 100 of FIG. 1 may include a social network server 126, the system server 140, the user device 102, the network 122, and a venue server 112. The social network server 126, the system server 140, the user device 102, and the venue server 112 (collectively, environment components) may communicate information and data via the network 122. For example, one or more of the environment components may communicate information and data related to ticket transactions such as the enhanced seat views, user input, and event information. Each of the environment components is briefly described in the following paragraphs.

The network 122 may include a wired network, a wireless network, or any combination thereof. The network 122 may include any suitable configuration or configurations including a star configuration, token ring configuration, or other configurations. The network 122 may include a local area network (LAN), a wide area network (WAN) (e.g., the Internet), and/or other interconnected data paths across which multiple devices may communicate. In some embodiments, the network 122 may include a peer-to-peer network. The network 122 may also be coupled to or include portions of a telecommunications network that may enable communication of data in a variety of different communication protocols. In some embodiments, the network 122 includes BLUETOOTH® communication networks and/or cellular communication networks for sending and receiving data including via short messaging service (SMS), multimedia messaging service (MMS), hypertext transfer protocol (HTTP), direct data connection, wireless application protocol (WAP), e-mail, and the like.

The user 116 may include an individual or an entity that may interface with the user device 102 to participate in a ticketing search or a ticketing transaction. For example, the user 116 may include a person who wants to purchase a ticket for a particular event that is going to take place in the venue 114. The user 116 may have a relationship of some kind with an associate 128. The associate 128 may include another individual. The relationship may be a friendship, a familial relationship, etc. The user 116 may be associated with the user device 102. The association between the user 116 and the user device 102 may include an ownership or regular operation of the user device 102 by the user 116.

The user device 102 may include a computing device that may include a processor, memory, and network communication capabilities. The user device 102 may be configured for communication with one or more other environment components via the network 122. Some examples of the user device 102 include a laptop computer, a desktop computer, a tablet computer, a mobile telephone, a smartphone, a personal digital assistant ("PDA"), a mobile e-mail device, a portable game player, a portable music player, smart wearable technology, or any other applicable electronic device capable of accessing the network 122.

The user device 102 may include a user input device 106, a display device 118, an orientation sensor 130, a user feedback device 131, and a ticket purchase module 105. The user input device 106 may include one or more pieces of hardware configured to notify the user 116 of the user device 102 of a communication, and/or present a communication to the user 116. In these and other embodiments, the user input device 106 may also be configured to receive input from the user 116 of the user device 102. The user input may include selecting, inputting, or inputting and selecting human base interactive questions, tasks, and user information, such as calendars, communication preferences, or contacts, among other information. In some embodiments, the user input device 106 may include one or more of: a speaker, a microphone, a display device (e.g., the display device 118), a joystick, a direction pad (D-pad), a trigger input, a motion sensor, eye tracker, a trackpad, a thermal input capturing device, a keyboard, and a touch screen, among other hardware devices.

The display device 118 may include a substantially planar surface on which information and data are displayed to the user 116. In addition, in some embodiments, at least a portion of the user input may be received by the display device 118. Some examples of the display device 118 may include a light emitting diode (LED) display, liquid crystal displays (LCD), thin film transistor (TFT) LCD, in-place switching (IPS) LCD, resistive touchscreen LCD, capacitive touchscreen LCD, organic LED (OLED), active-matrix OLED, etc.

The orientation sensor 130 may include any sensor that is configured to measure data representative of movement of the user device 102. For example, the orientation sensor 130 may include one or more accelerometers, which may be 3-axis sensors; one or more gyroscopic sensors; magnetic sensors; and the like. The orientation sensors 130 may be configured to measure rotation of the user device 102 relative to an axis as well as rotational or translational motion of the user device 102 relative to a previous position.

The user feedback device 131 may include any device that communicates some feedback to the user 116. The feedback may be based on data such as the digital model or the enhanced seat view received by the user device 102. In some embodiments, the user feedback device 131 may include a haptic output device. The haptic output device may apply a force, motion, vibration, or some combination thereof to the user 116. For instance, the enhanced seat view may be communicated to the user device 102. As the user 116 moves the user device 102 portions of the enhanced seat view or the digital model forming the basis thereof may change. In addition, in embodiments including the haptic output device, some feedback (e.g., a vibration or a pressure) may be conveyed to the user 116.

In some embodiments, the user device 102 may omit the orientation sensor 130. In these and other embodiments, the user input device 106 and/or the display device 118 may be used to simulate or indicate movement of the user device 102. For example, instead of physically moving the user device 102, the user 116 may operate the user input device 106, which may simulate movement of the user device 102.

FIG. 1 illustrates the display device 118, the user input device 106, and the orientation sensor 130 as separate devices. In some embodiments, one or more of the display device 118, the user input device 106, and the orientation sensor 130 may be included in one device.

The ticket purchase module 105 may be configured to implement a marketplace interaction or an online ticket exchange with the system server 140 that involves one or more of the enhanced seat views. In some embodiments, the ticket purchase module 105 may display on the display device 118 of the user device 102, a digital map. The digital map (some details of which are provided below) is a representation of the venue 114. The digital map may depict seating sections and/or seats of the venue 114 arranged for a particular event.

The ticket purchase module 105 may receive user input via the user input device 106. The user input may be used to select one seating section or one seat of the venue 114. The ticket purchase module 105 may receive or access from the system server 140 or a server ticket module 104 a two-dimensional image of a view from the selected seating section or the selected seat. Additionally or alternatively, the ticket purchase module 105 may receive or access one or more enhanced image digital icons. The ticket purchase module 105 may display the two-dimensional image and/or one or more enhanced image digital icons on the display device 118.

The ticket purchase module 105 may communicate additional user input used to select one of the enhanced image digital icons. In response, the ticket purchase module 105 may receive or access an enhanced seat view that is consistent with the selected enhanced image digital icons. The ticket purchase module 105 may display a first portion of the enhanced seat view. The first portion of the enhanced seat view may correspond to a first line of sight orientation of the user device 102 from the selected seating section or from the selected seat. In some embodiments, the first line of sight orientation is determined by the ticket purchase module 105 based on orientation data measured by the orientation sensor 130. In other embodiments, the first portion of the enhanced view may be a default portion of the enhanced seat view (e.g., a view directed towards the stage or point of interest of the venue).

The ticket purchase module 105 may receive sensor data from the orientation sensor 130 included in the user device 102. The sensor data may be indicative of a movement of the user device 102 from the first line of sight orientation to a second line of sight orientation. In response to receipt of the sensor data, the ticket purchase module 105 may display on the display device 118 a second portion of the enhanced seat view. The second portion of the enhanced seat view may correspond to the second line of sight orientation of the user device 102 from the selected seating section or from the selected seat.

The ticket purchase module 105 may display an informational overlay of event information, a digital indicator of the associate 128, a relocation icon, or some combination thereof on the display device 118. The informational overlay, the digital indicator, and the relocation icon are described below.

The ticket purchase module 105 may be implemented using hardware including a processor, a microprocessor (e.g., to perform or control performance of one or more operations), a field-programmable gate array (FPGA), or an application-specific integrated circuit (ASIC). In some other instances, the ticket purchase module 105 may be implemented using a combination of hardware and software. Implementation in software may include rapid activation and deactivation of one or more transistors or transistor elements such as may be included in the hardware of a computing system (e.g., the user device 102). Additionally, software defined instructions may operate on information within transistor elements. Implementation of software instructions may at least temporarily reconfigure electronic pathways and transform computing hardware.

Some of the enhanced seat views are configured for embodiments in which the user device 102 is a smartphone or similar handheld computing device (e.g., a tablet). In these and other embodiments, the user device 102 may be implemented with an augmented reality (AR) platform 124. For example, the enhanced seat view may be a dual image that when viewed by an AR platform results in a three-dimensional image. Some examples of the AR platform 124 include GOOGLE CARDBOARD®, SAMSUNG GEAR VR®, or a similar system. The enhanced seat view that includes a dual image may be a stereoscopic 360 view.

The venue 114 may include any forum in which events may take place or are performed. Some examples of the venue 114 may include a stadium, an arena, a theatre, a parking lot, a fairground, and the like. The event may include any type of happening in which tickets are used for entry. Some examples of the event are sporting events, concerts, plays, movies, festivals, and the like. The venue 114 may be associated with the venue server 112.

The venue server 112 may include a hardware server that includes a processor, memory, and network communication capabilities. In the illustrated implementation, the venue server 112 is configured to communicate via the network 122 with the other environment components. The venue server 112 may track event information that pertains to a particular event that is to occur or is occurring at the venue 114. For example, the event information may include ticket prices or ticket availability.

The system server 140 may include a hardware server that includes a processor, memory, and network communication capabilities. In the illustrated implementation, the system server 140 is configured to communicate via the network 122 with the other environment components.

The system server 140 may include an event information database (in FIG. 1, event info. DB) 110, venue images 108, and the server ticket module 104. The event information database 110 may store event information pertaining to one or more particular events occurring at the venue 114. For example, the event information includes one or more ticket prices for one or more seating sections or from one or more seats of the venue 114, ticket availability for one or more seating sections or for one or more of the seats of the venue 114, and the like.

The event information may originate at the system server 140. For instance, the event information may be generated through sales of tickets to users (e.g., 116). The event information may also originate at the venue server 112. The venue server 112 may track ticket sales via the system server 140 and/or via other systems. The venue server 112 may communicate the event information representative of the ticket sales to the system server 140. Accordingly, the event information database 110 may include updated event information. Although not explicitly shown in FIG. 1, the event information in the event information database 110 may also originate at other sources. While the event information database 110 is depicted in the system server 140, in other embodiments, the event information database 110 may be located remotely and accessed by the system server 140.

The venue images 108 may include two-dimensional digital images, the enhanced seat views, and digital maps of the venue 114. The two-dimensional digital images may be non-interactive or fixed views from one or more of the seats and/or views from one or more of the seating sections of the venue 114. The two-dimensional digital images may include portions of a computer-aided design (CAD) model of the venue 114 and/or actual photographic images of the venue 114.

The enhanced seat views may include portions of the CAD model and/or actual photographic images of the venue 114. In embodiments in which the enhanced seat view includes photographic images of the venue 114, the user device 102 may be used as a viewfinder through which the venue 114 is viewed. Photographic images displayed on the display device 118 may be enhanced by overlaying information over the photographic images. The information overlaid on the photographic image may include informational overlays (e.g., seat prices and/or seat availability), relocation icons, a digital indicator that corresponds to an associate 128, or some combination thereof.

The enhanced seat views may include interactive views from one or more of the seats and/or interactive views from one or more of the seating sections of the venue 114. The enhanced seat views may be responsive to movement of the user device 102. For instance, the enhanced seat view may include a 360-degree image. In some embodiments, only a portion of the enhanced seat view is displayed on the display device 118 at a time. The portion of the enhanced seat view that is displayed corresponds to a line of sight orientation of the user device 102 from a seating section or a seat, which simulates a view the user 116 would have if they were standing or sitting in the seating section or at the seat. The portion of the enhanced seat view may change with movement of the user device 102, which may simulate movement of the head or eyes of the user 116 while standing in the seating section or the seat.

In some embodiments, the two-dimensional digital images may be combined to create 360-degree images. Some additional details of creation of the 360-degree images are provided below. The enhanced seat views may include panorama digital images and/or dual images that when viewed by the AR platform 124 results in a three-dimensional image. While the venue images 108 is depicted in the system server 140, in other embodiments, the venue images 108 may be located remotely and accessed by the system server 140.

The digital map may be an elevation view, another view, a portion thereof, of the venue 114. The digital map may include multiple seating sections and/or seats of the venue 114 as arranged for a particular event. For example, the seating sections may be relocated based on the position of a stage or floor for a particular event. The digital map may reflect these arrangements.

In some embodiments, the seating sections and/or the seats of the digital map may be icons that are selectable. For example, the user 116 may select one of the seating sections or one of the seats using the user input device 106. Selection of the seating section or of the seat may prompt display of the two-dimensional image and/or enhanced seat view on the display device 118. The digital map may also include some portion of the event information such as the price information or ticket availability. The event information may appear on the digital map when a cursor is placed within or proximate to the icon of the seating section or the seat.

The server ticket module 104 may be configured to implement a marketplace interaction of an online ticket exchange with the user device 102 that involves one or more of the enhanced seat views. In some embodiments, the server ticket module 104 may communicate to the user device 102, the digital map. The server ticket module 104 may communicate the digital map to the user device 102 or may enable access to the digital map by the user device 102. Additionally or alternatively, the server ticket module 104 may provide or communicate instructions to the user device 102 that result in access to the digital map on the display device 118.

The server ticket module 104 may receive, from the user device 102, user input. The user input may be used to select one seating section or one seat of the venue 114. In response to the user input that selects the seating section or the seat, the server ticket module 104 may communicate to the user device 102 a two-dimensional digital image of a view from the selected section or from the seat.

Additionally, in response to the user input that selects the seating section or the seat, the server ticket module 104 may communicate to the user device 102 one or more enhanced image digital icons. The one or more enhanced image digital icons may include a panorama digital icon and/or a virtual reality (VR) digital icon. In some embodiments, the one or more enhanced image digital icons may be displayed on a portion of the two-dimensional digital image.

As above, the server ticket module 104 may communicate or enable access to the two-dimensional digital image and/or the enhanced image digital icons. Additionally or alternatively, the server ticket module 104 may provide instructions that result in access to the two-dimensional digital image and/or the enhanced image digital icons by the user device 102.

The server ticket module 104 may receive, from the user device 102, additional user input. The additional user input may be used to select one of the one or more enhanced image digital icons. In response to the additional user input that selects one of the enhanced image digital icons, the server ticket module 104 may communicate to the user device 102 the enhanced seat view that is consistent with the selected enhanced image digital icons. A first portion of an enhanced seat view may be displayed on the display device 118. The first portion of the enhanced seat view corresponds to a first line of sight orientation of the user device 102 from the selected seating section or from the selected seat.

As mentioned above, the enhanced seat view may depict a seat view from a particular location (e.g., a seat or a seating section) in the venue 114. The enhanced seat view may be generated based on three-dimensional models of the venue 114. The three-dimensional models may additionally enable identification of three-dimensional features of the venue 114 such as the seating sections, seats, floor, and the like. In addition, the three-dimensional models may enable the overlay of information in the enhanced seat views that are related to the three-dimensional features as described elsewhere in this disclosure. Additionally still, the three-dimensional models may enable the enhanced seat views to include special venue decorations such as team logos. Moreover, in some embodiments the enhanced seat view may include 3D routing that may indicate a route from a seating section or a seat to a venue facility such as a shop or a bathroom.

Generation of the enhanced seat view may include a capturing phase. In the capturing phase, images may be taken similar to capturing a photograph from a three dimensional model of the venue 114. For example, an image may be taken (automatically or manually) facing multiple directions from a particular location (e.g., a seat). The multiple directions may include at least an up-facing direction, a front-facing direction, a back-facing direction, a left-facing direction, a right-facing direction, and a down-facing direction (or the resulting vectors). The multiple directions point to the faces of a sphere (in this example a cube, a six faces sphere per se). The images may then be stitched together around a higher resolution sphere. The more images taken and stitched together in the first "pseudo-sphere" the higher the quality of the final enhanced seat view.

In other examples, a virtual double fish-eye lens may be used to capture the surroundings by reflecting the surrounding "virtual light" onto a surface of the sphere. The sphere may then be unwrapped to conform to a two-dimensional rectangle. The two-dimensional rectangle may include a particular ratio of dimensions. For instance, a length of the two-dimensional rectangle may be double a height of the two-dimensional rectangle.

To render the enhanced seat view on the user device 102, the images resulting from the capturing phase may be transferred via the network 122 and fed into a viewer. The viewer may project the images back into a sphere with one or more adjustments. A camera may be positioned at the center of the sphere. The camera may project directly onto a screen to produce the panorama view.

For the dual images that result in the three-dimensional image, two cameras are used within two spheres. For the dual images, the virtual cameras lenses may be adjusted to conform to lenses present in the viewer and then projected onto a screen as two images that are positioned side-by-side. The adjustment or image deformation may result in a perception of distortion around the edges if viewed without an AR platform (e.g., AR platform 124).

In both cases (the panorama and the dual images), lighting may be used for the virtual cameras to perceive the "virtual light" and perform their function.

In other embodiments, generation of the enhanced seat view may include using six images. Similar to the capturing phase above, the six images may include an up-facing direction, a front-facing direction, a back-facing direction, a left-facing direction, a right-facing direction, and a down-facing direction. The images are not stitched or mapped to a sphere, which may make the initial image acquisition simpler and faster. These images are instead transferred over the network 122 and then projected into the corresponding faces of a cube. Pixel data of the projections may be adjusted such that the perception of the cube edges is unnoticeable or substantially unnoticeable.

In other embodiments, generation of the enhanced seat view may include capturing images from the faces of the resulting sphere from the capturing technique described above. The captured images may be streamed on demand to the user device 102 via the network 122 as orientation of the user device 102 is changed. In these embodiments, the involvement of the user device 102 may be limited to display the streamed images. The images from the different directions may serve as a frame of the enhanced seat view. This technique may result in faster data transfer speeds when high quality imagery is involved.

In some embodiments, the server ticket module 104 may access event information for the particular event. The server ticket module 104 may overlay on the enhanced seat view an informational overlay of the event information. The informational overlay or an icon included therein may be overlaid over a portion of the enhanced seat view to which the event information is relevant. For example, the event information may include a seat price of a particular seat. The informational overlay may include an icon overlaid over the particular seat in the enhanced seat view. The informational overlay may be displayed on the display device 118 in response to the user device 102 being oriented such that the portion of the enhanced seat view that includes the informational overlay corresponds to a line of sight orientation of the user device 102.

Additionally or alternatively, a relocation icon may be included on the informational overlay. The server ticket module 104 may receive, from the user device 102, user input used to select the relocation icon. In response to selection of the relocation icon, the server ticket module 104 may communicate a second enhanced seat view. The second enhanced seat view may include a 360-degree interactive view from the seating sections or the seat that corresponds to where the relocation icon is positioned. A first portion of the second enhanced seat view may be displayed on the display device 118. The first portion of a second enhanced seat view corresponds to a first line of sight orientation of the user device 102.

In some embodiments, the enhanced seat view may include one or more representations of individuals. The representations of individuals may include representations of event goers and/or players/actors within the venue 114. The representations of the individuals may contribute to an understanding of the user 116 as to an overall experience of attending the particular event at the venue 114. The features of the representations of individuals may include animations, such as walking, or performing the activities of the particular event.

The server ticket module 104 may display on the display device 118 a purchase icon. The server ticket module 104 may receive, from the user device 102, user input used to select the purchase icon. In response to the user input that selects the purchase icon, the server ticket module 104 may execute an electronic transaction for a ticket for the particular event in the selected seating section or for the selected seat.

The server ticket module 104 may be implemented using hardware including a processor, a microprocessor (e.g., to perform or control performance of one or more operations), an FPGA, or an ASIC. In some other instances, the server ticket module 104 may be implemented using a combination of hardware and software. Implementation in software may include rapid activation and deactivation of one or more transistors or transistor elements such as may be included in hardware of a computing system (e.g., the system server 140). Additionally, software defined instructions may operate on information within transistor elements. Implementation of software instructions may at least temporarily reconfigure electronic pathways and transform computing hardware.

The social network server 126 may include a hardware server that includes a processor, memory, and network communication capabilities. In the illustrated implementation, the social network server 126 is configured to communicate via the network 122 with the other environment components. The social network server 126 may be configured to support a social network. The social network may include a social structure in which the user 116, the associate 128, and/or multiple other entities may be connected by a common feature. The common feature may include relationships or connections such as friendship, family, work, an interest, and the like. The relationships and/or the common features may form a social graph in the social network. In some examples, the social graph may reflect a mapping of the online users and how they may be related.

The social network server 126 may be accessible by the system server 140. For example, a user account and other social media information of the associate 128 on the social network server 126 may be accessed by the system server 140 or the server ticket module 104 included therein. Additionally or alternatively, the associate 128 and/or the user 116 may indicate that the associate 128 and the user 116 have a relationship. Accordingly, the system server 140 may know of or ascertain that a relationship exists between the user 116 and the associate 128. A ticket purchased by the associate 128 for a particular event and information associated therewith (e.g., a seat location) may be recorded with the system server 140.

The system server 140 may overlay on the enhanced seat view a digital indicator that corresponds to the associate 128. The digital indicator may be overlaid over the portion of the enhanced seat view that corresponds to the seat location of the ticket purchased by the associate 128. The system server 140 may display the digital indicator on the display device 118 in response to the user device 102 being oriented such that the portion of the enhanced seat view that includes the digital indicator corresponds to the line of sight orientation of the user device 102. Additionally, in some embodiments, the system server 140 may alert the user 116 via the user device 102 that the associate is attending the particular event.

For example, as the user 116 searches for tickets for the particular event, the system server 140 may make the user 116 aware that the associate 128 has purchased a ticket to the particular event. The user 116 may wish to purchase a ticket near the seat location of the associate 128. The enhanced seat view may thus present the digital indicator and/or alert the user 116 as to the seat location of the associate 128.

Additionally, the user 116 may purchase a ticket prior to purchase by the associate 128. At a time between the purchase by the user 116 and the event, the system server 140 may alert the user 116 that the associate 128 also purchased a ticket to the event. The system server 140 may communicate the enhanced seat view including the digital indicator that depicts the seat location of the associate 128. The user 116 may then determine whether they would like to upgrade their ticket to sit near the associate 128.

The social network server 126 may be responsive to data requests such as application programming interface (API) calls. The data requests may request data related to one of the users and the social network activities associated with the corresponding user.

In the operating environment 100, memory in one or more of the environment components may be similar to memory 1208 described with reference to FIG. 12, processors in one or more of the environment components may be similar to a processor 1204 described with reference to FIG. 12, and network communication capabilities of one or more of the environment components may be provided by a communication unit 1202 described with reference to FIG. 12.

Modifications, additions, or omissions may be made to the operating environment 100 without departing from the scope of the present disclosure. Specifically, embodiments depicted in FIG. 1 include one or more user devices 102, one or more users 116, one or more social network servers 126, one or more associates 128, one or more venue servers 112, one or more venues 114, one or more system servers 140, or some combination thereof.

Moreover, the separation of various components in the embodiments described herein is not meant to indicate that the separation occurs in all embodiments. It may be understood with the benefit of this disclosure that the described components may be integrated together in a single component or separated into multiple components. For example, in some embodiments, the user input device 106 and the display device 118 may be a single device.

Figure 2:
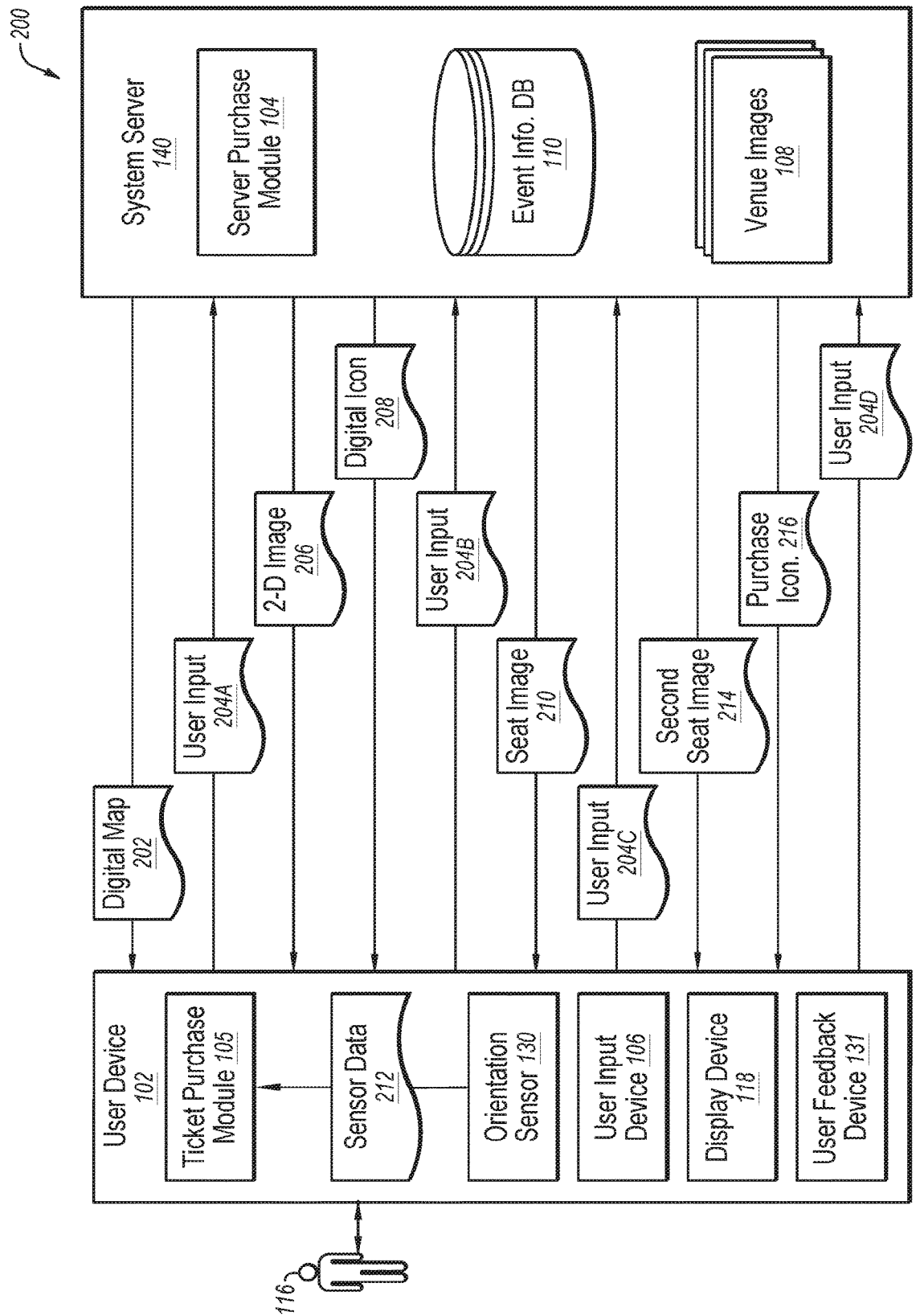
FIG. 2 illustrates a block diagram of an example process that may be implemented in the operating environment of FIG. 1.

FIG. 2 illustrates a block diagram of an example ticket exchange process (process) 200 that may be implemented in the operating environment 100 of FIG. 1. The process 200 of FIG. 2 may involve one or more operations that include exchanges of information between the user device 102 and the system server 140 described with reference to FIG. 1. Although not explicitly depicted in FIG. 2, data and information may be communicated between the user device 102 and the system server 140 and may be via a network such as the network 122 of FIG. 1. The process 200 of FIG. 2 is described in a particular order. However, one or more of the operations in the process 200 may be performed in another order, combined, or omitted.

The process 200 may begin by the user 116 initiating a marketplace interaction. For example, the user 116 may open a mobile application that is configured to perform the marketplace interaction. The user 116 may search for a particular event, a particular venue, and the like. In response to the search, the system server 140 or the server ticket module 104 may communicate a digital map 202 to the user device 102.

Figure 3:
FIG. 3 depicts an example screen shot including an example digital map.

With reference to FIG. 3, a screen shot including an example digital map 202 is depicted. The digital map 202 of FIG. 3 is AT&T PARK in San Francisco, Calif. In the digital map 202, a field 302 is depicted along with icons representative of multiple seating sections 304 as arranged for a major league baseball game. In FIG. 3, only one of the seating sections 304 is labeled. Each of the seating sections 304 includes numbers that designate the seating section 304. Although not explicitly depicted in FIG. 3, in some embodiments, the digital map 202 may include icons representative of seats, which may be within the multiple seating sections 304.

Figure 4:
FIG. 4 depicts another example screen shot that includes a portion of the digital map of FIG. 3.

FIG. 4 depicts a screen shot that includes a portion of the digital map 202 of FIG. 3 with price information 402 displayed. The price information 402 may be displayed in response to a cursor or another suitable object being placed within the icon of the seating section 304. In particular, in FIG. 4, price information 402 (e.g., "$43.00") of the seating section 304, which is labeled "223", is displayed.

Referring to FIG. 2, a first user input 204A may be communicated from the user device 102 to the system server 140. The first user input 204A may be received from the user device 102. The first user input 204A may be used to select one seating section from the seating sections or to select a seat from the seats of the digital map. Referring back to FIG. 4, the first user input 204A may include the user 116 using the user input device 106 to select the icon of the seating section 304.

Referring to FIG. 2, the system server 140 may communicate a two-dimensional image (in FIG. 2 "2-D image") 206 to the user device 102. The two-dimensional image 206 may be displayed by the display device 118.

Figure 5:
FIG. 5 depicts another screen shot that includes an example two-dimensional image.
Figure 6:
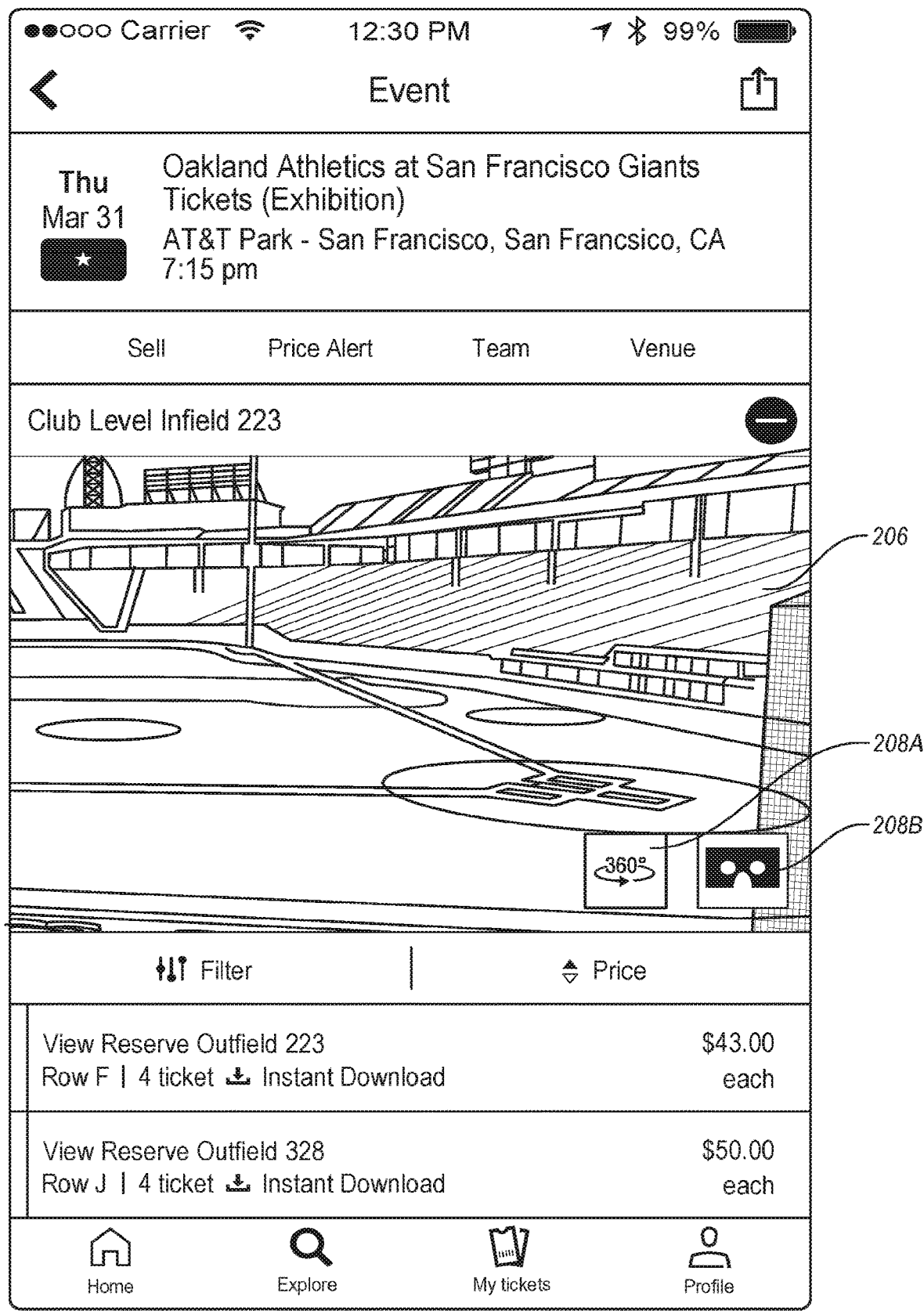
FIG. 6 depicts another screen shot that includes another view of the two-dimensional image of FIG. 5.

FIGS. 5 and 6 depict screen shots that include an example two-dimensional image 206. In FIG. 5, the two-dimensional image 206 is displayed up and to the right of the digital map 202. In FIG. 6, the two-dimensional image 206 is enlarged to occupy the area previously occupied by the digital map (202 of FIG. 5). The two-dimensional image 206 may include a non-interactive view from the selected section (in this example, section 223).

Referring back to FIG. 2, the system server 140 may communicate one or more enhanced image digital icons (in FIG. 2, "digital icon") 208. Referring to FIG. 6, two enhanced image digital icons 208A and 208B are depicted on the two-dimensional image 206. The first of the enhanced image digital icons 208A may include a panorama digital icon. The second of the enhanced image digital icons 208B may include a VR digital icon.

Referring to FIG. 2, a second user input 204B may be communicated from the user device 102 to the system server 140. The second user input 204B may be used to select one of the one or more enhanced image digital icons 208. Referring to FIG. 6, the second user input may include the user 116 using the user input device 106 to select one of the enhanced image digital icons 208A or 208B.

Referring to FIG. 2, in response to the second user input 204B that selects one of the enhanced image digital icons 208, the system server 140 may communicate an enhanced seat view (in FIG. 2, "seat image") 210. The enhanced seat view 210 communicated to the user device 102 is consistent with the selected enhanced image digital icons 208. For instance, if the second user input 204B includes a selection of the panorama digital icon, the enhanced seat view 210 is a panorama enhanced seat view. Similarly, if the second user input 204B includes a selection of the VR digital icon, the enhanced seat view 210 is a VR enhanced seat view.

The enhanced seat view 210 includes a view from the selected seating section or from the selected seat. A first portion of an enhanced seat view may be displayed on the display device 118. The first portion of the enhanced seat view 210 corresponds to a first line of sight orientation of the user device 102 as viewed from the selected seating section or from the selected seat.

Figure 7A:
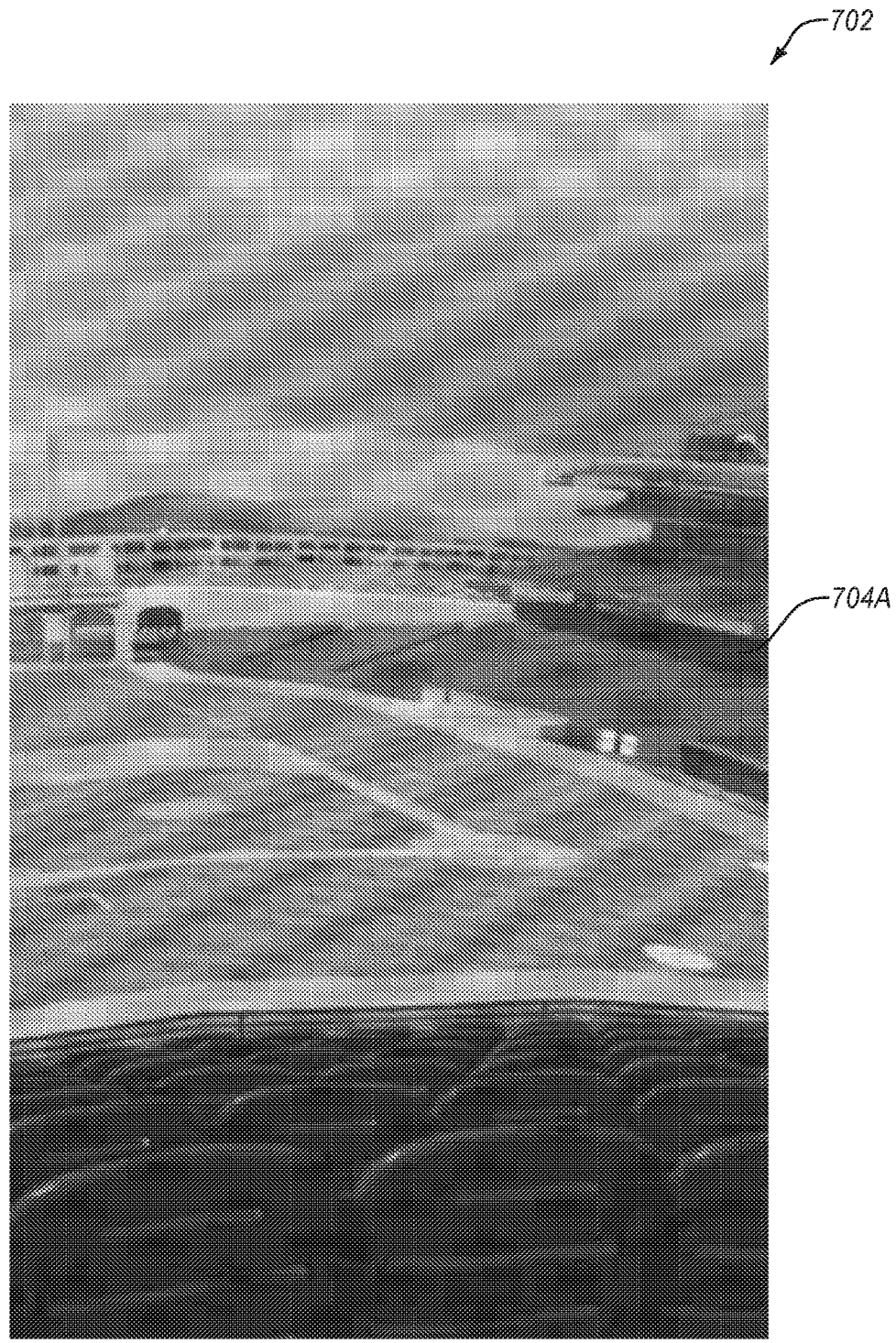
FIG. 7A depicts another screen shot of an example first portion of an enhanced seat view.

FIG. 7A is a screen shot of an example first portion 704A of an enhanced seat view 210. The first portion of an enhanced seat view 210 of FIG. 7A is a portion of a panorama digital image 702. Accordingly, the panorama digital image 702 may be communicated by the system server 140 in response to the user 116 selecting the first of the enhanced image digital icons 208A of FIG. 6. The first portion 704A of the panorama digital image 702 corresponds to a first line of sight orientation of the user device 102 as viewed from the selected seating section.

Figure 8A:
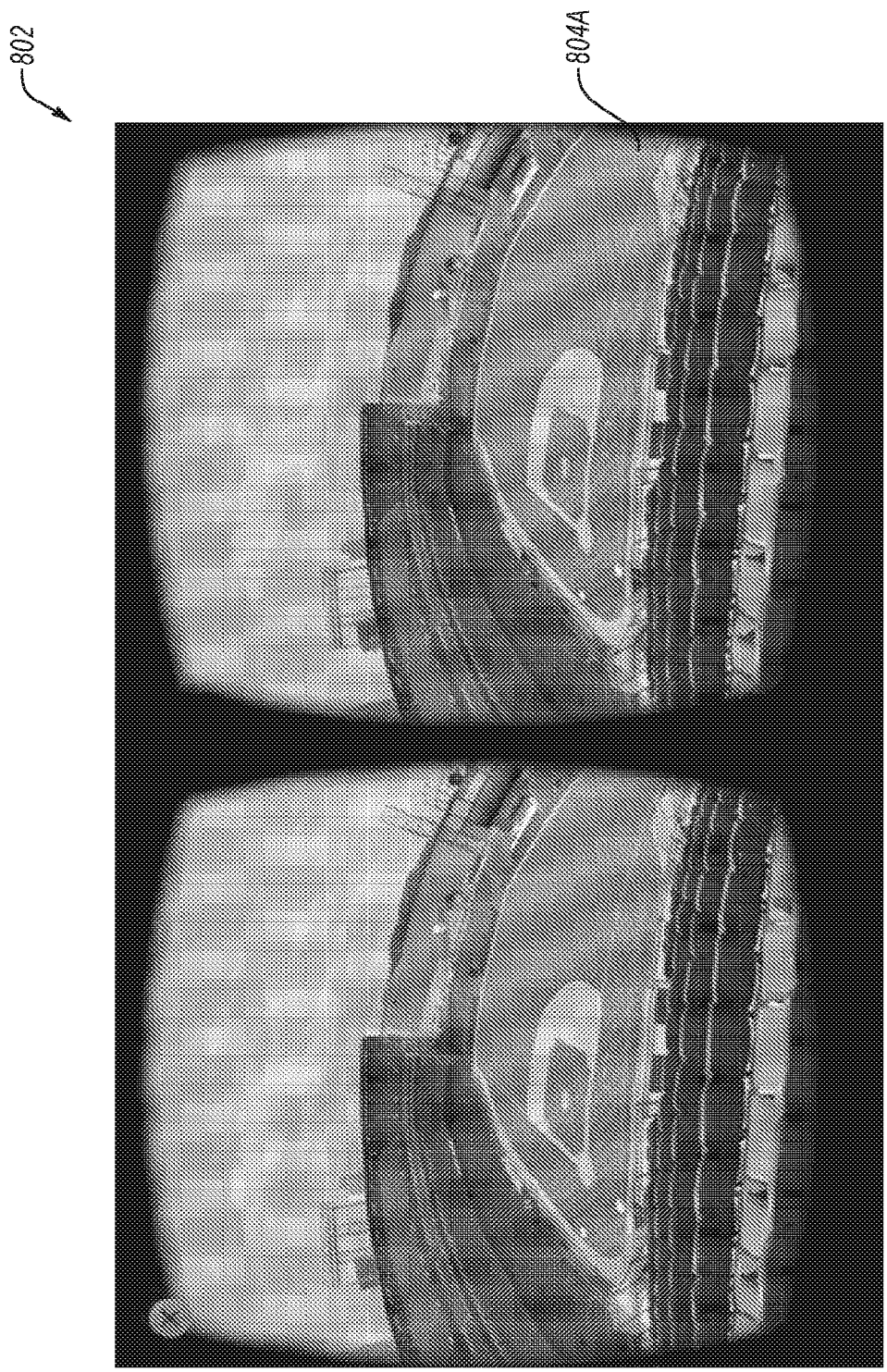
FIG. 8A depicts another screen shot of another example first portion of another enhanced seat view.

FIG. 8A is a screen shot of another example first portion 804A of an enhanced seat view 210. The first portion 804A of an enhanced seat view 210 of FIG. 8A is a portion of a dual image 802 that when viewed by an AR platform results in a three-dimensional image. Accordingly, the dual image 802 may be communicated by the system server 140 in response to the user 116 selecting the second of the enhanced image digital icons 208B of FIG. 6.

Referring to FIG. 2, sensor data 212 may be measured by the orientation sensor 130 and communicated to the ticket purchase module 105. The sensor data 212 may be indicative of a movement of the user device 102 from the first line of sight orientation to a second line of sight orientation. In response to receipt of the sensor data 212, the user device 102 may display on the display device 118 a second portion of the enhanced seat view 210. The second portion of the enhanced seat view 210 corresponds to the second line of sight orientation of the user device 102 from the selected seating section or from the selected seat.

Figure 7B:
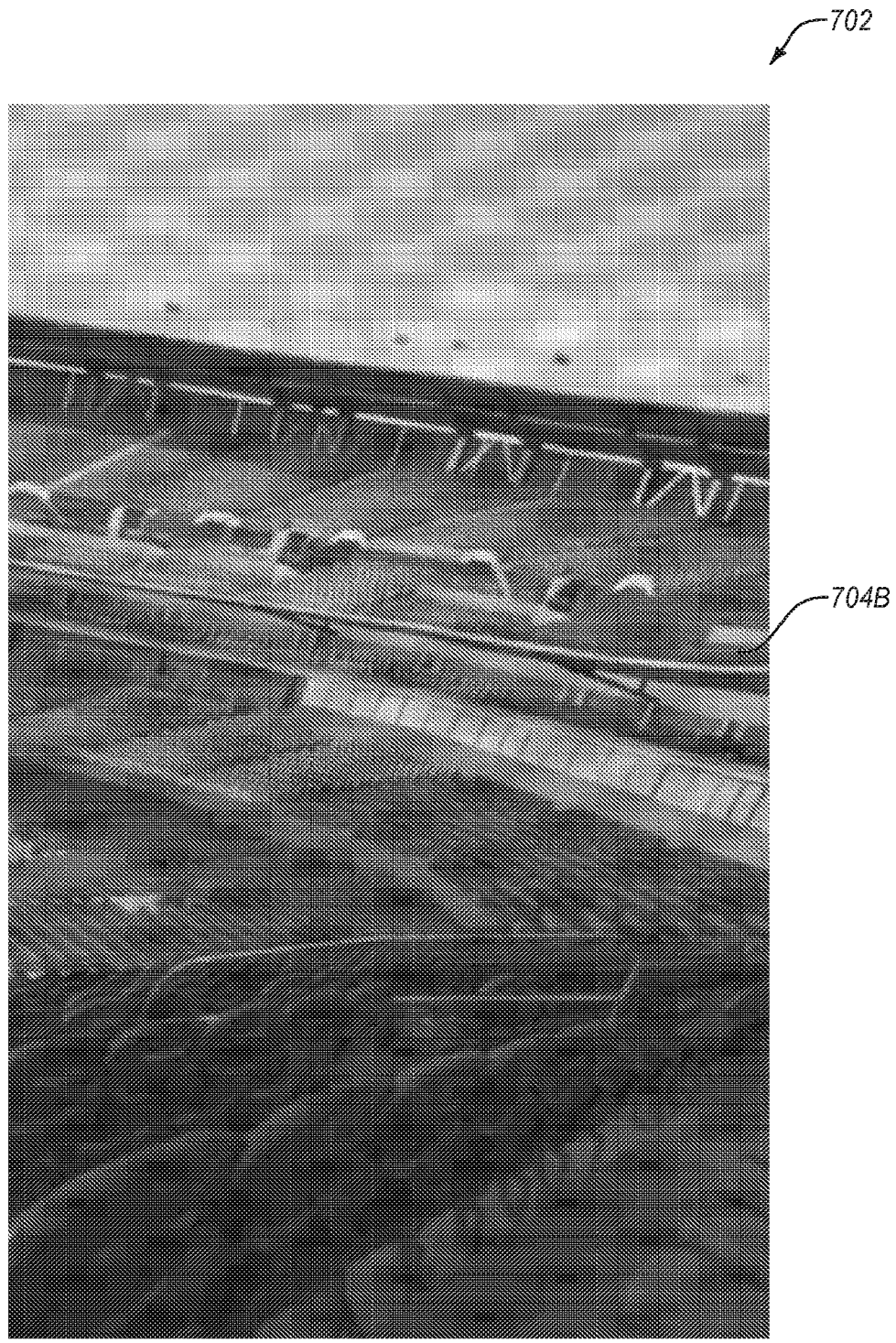
FIG. 7B depicts another screen shot of a second portion of the enhanced seat view of FIG. 7A.
Figure 7C:
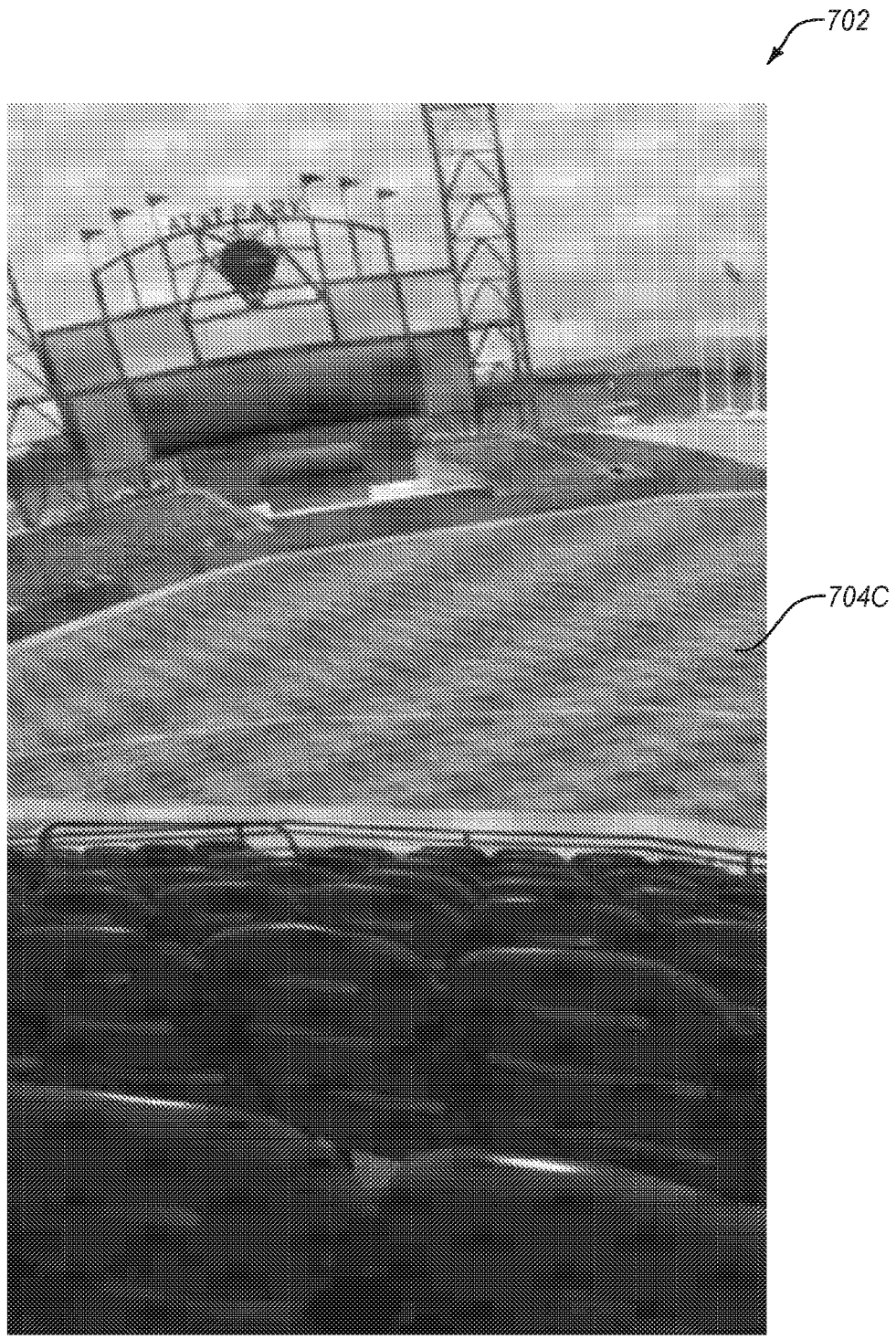
FIG. 7C depicts another screen shot of a third portion of the enhanced seat view of FIG. 7A.

FIGS. 7B and 7C are screen shots that depict a second portion 704B and a third portion 704C of the panorama digital image 702, respectively. In particular, the FIG. 7B is the second portion 704B of the panorama digital image 702 that may be displayed on the display device 118. The second portion 704B may be displayed in response to sensor data 212 indicating that the user device 102 is rotated clockwise (when viewed from above as described in FIGS. 11A and 11B) from the position from which the first portion 704A of FIG. 7A is derived. FIG. 7C is a third portion 704C of the panorama digital image 702. The third portion 704C may be displayed on the display device 118 in response to sensor data 212 indicating that the user device 102 is rotated counterclockwise from the position from which the first portion 704A of FIG. 7A is derived and counterclockwise from the position from which the second portion 704B of FIG. 7B is derived.

Figure 8B:
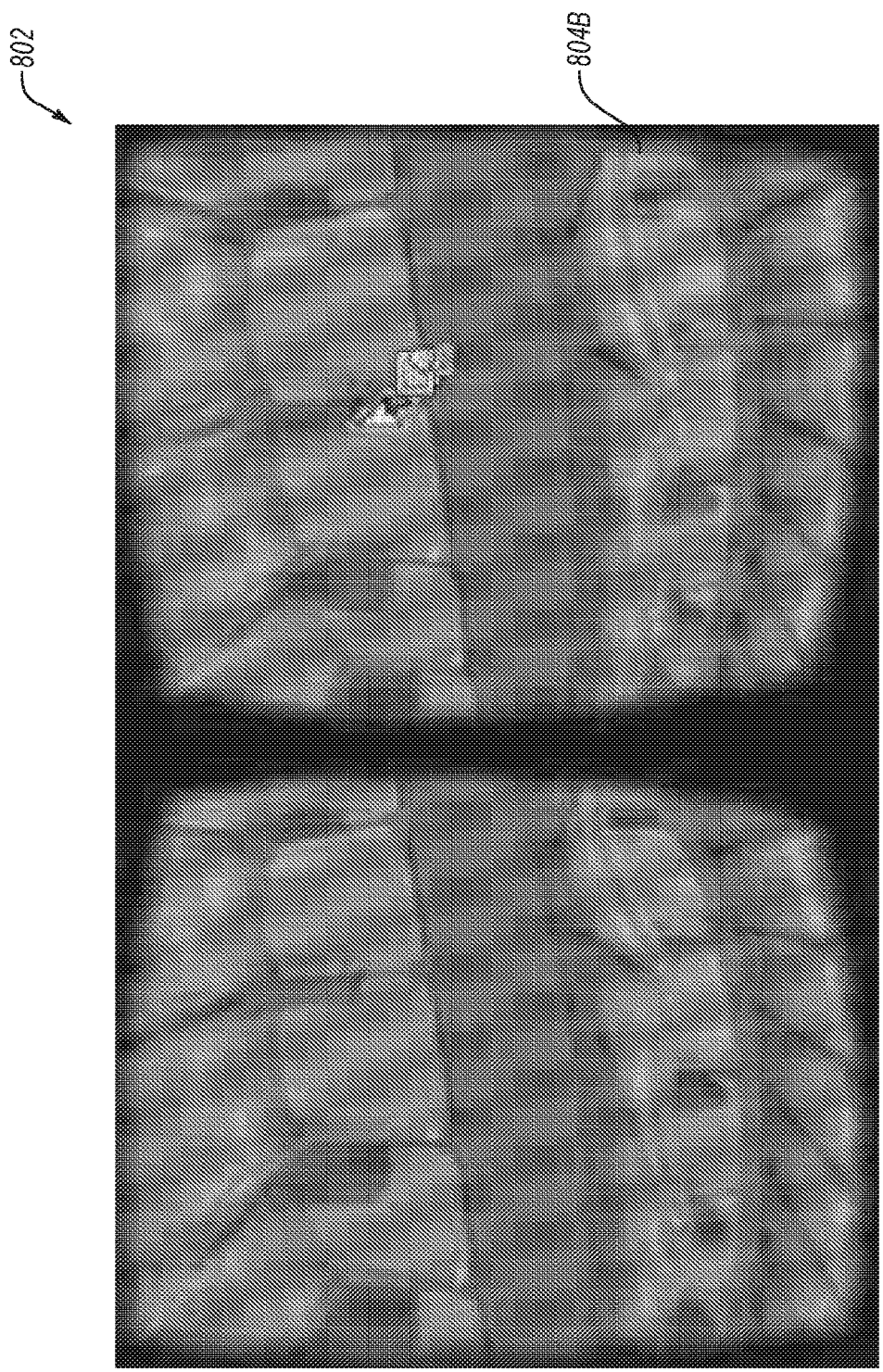
FIG. 8B depicts another screen shot that includes a second portion of the enhanced seat view of FIG. 8A.

FIG. 8B is a screen shot that depicts a second portion 804B of the dual image 802. In particular, the FIG. 8B is the second portion 804B of the dual image 802 that may be displayed on the display device 118 in response to sensor data 212 indicating that the user device 102 is rotated vertically towards the stadium floor from the position from which the first portion 804A of FIG. 8A is derived.

As described above, the system server 140 may overlay an informational overlay on the enhanced seat view 210. The informational overlay may include event information stored in the event information database 110. The informational overlay is overlaid over a portion of the enhanced seat view 210 to which the event information is relevant. Additionally, the enhanced seat view 210 may include a relocation icon. The relocation icon may be associated with the informational overlay.

In circumstances in which the enhanced seat view 210 includes the informational overlay, the user device 102 may display the informational overlay on the display device 118 in response to the user device 102 being oriented such that the portion of the enhanced seat view 210 that includes the informational overlay corresponds to a line of sight orientation of the user device 102. The relocation icon may be displayed with or in the informational overlay.

The user 116 may provide a third user input 204C. The third user input 204C may be used to select the relocation icon. The third user input 204C may be communicated to and received by the system server 140. In response to selection of the relocation icon, a second enhanced seat view 214 may be communicated by the system server 140 to the user device 102. The second enhanced seat view 214 may include a 360-degree interactive view from a relocation location. The user device 102 may display on the display device 118 a first portion of a second enhanced seat view 214. The first portion of the second enhanced seat view 214 corresponds to a first line of sight orientation of the user device 102.

Figure 9:
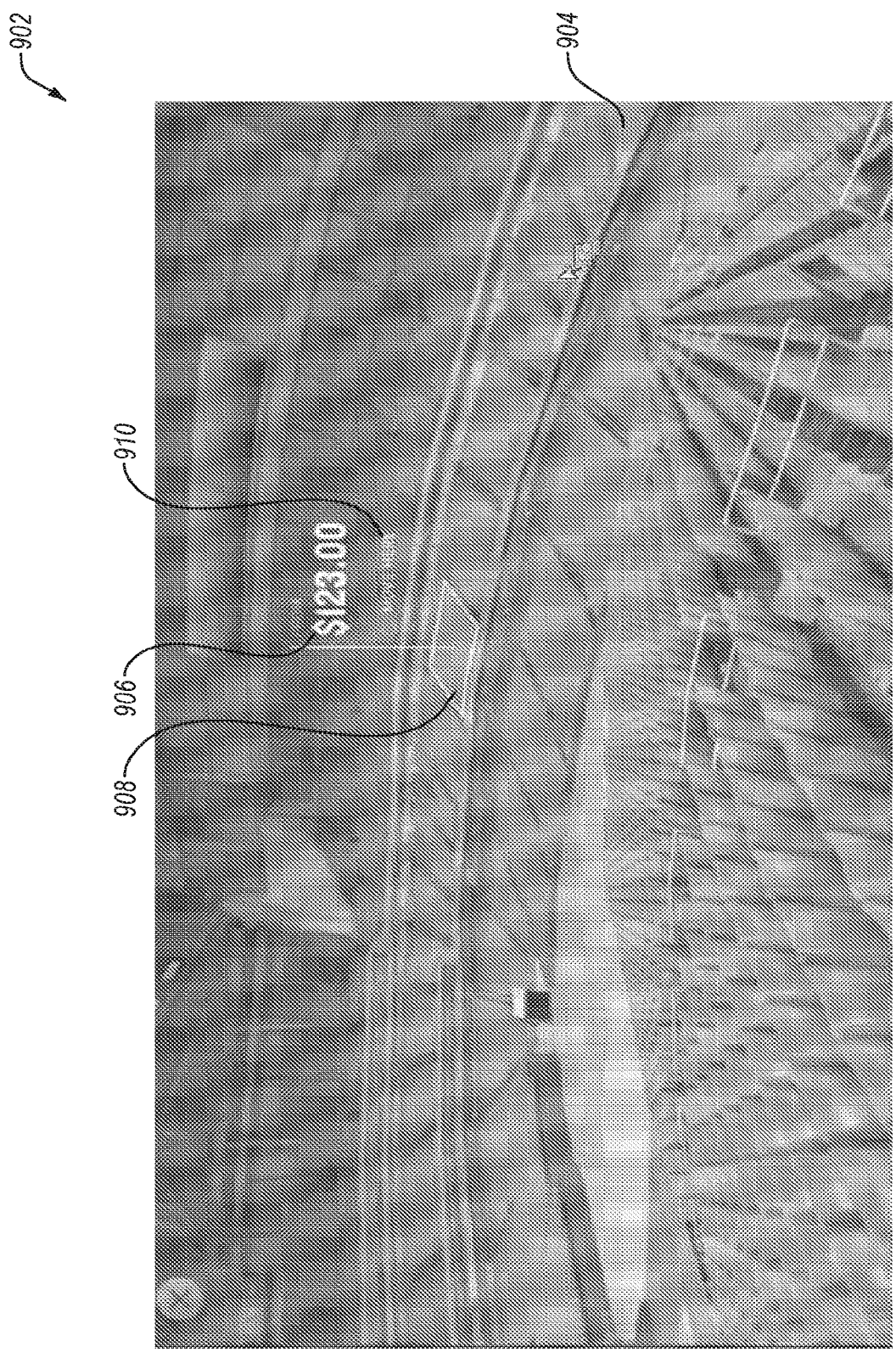
FIG. 9 depicts another screen shot of a portion of another enhanced seat view.

FIG. 9 is a screen shot of a portion 904 of an enhanced seat view 902. The portion 904 of the enhanced seat view 902 includes an example informational overlay 906. The informational overlay 906 includes price information from a seating section 908 that is within the portion 904 of the enhanced seat view 902. In other examples, the informational overlay 906 may include other event information.

The portion 904 of the enhanced seat view 902 includes an example relocation icon 910. The relocation icon 910 states "MOVE HERE." In response to selection of the relocation icon 910, a second enhanced seat view may be communicated to the user device 102. The second enhanced seat view 214 includes a 360-degree interactive view from the seating section 908. The enhanced seat view 902 of FIG. 9, which includes the relocation icon 910 and the informational overlay 906, is a panorama digital image. It may be appreciated with the benefit of this disclosure that the relocation icon 910 and the informational overlay 906 may be included in enhanced seat views that include a dual image (e.g., FIGS. 8A and 8B).

In some embodiments, the system server 140 may overlay a digital indicator that corresponds to an associate (e.g., the associate 128 of FIG. 1) of the user 116. The digital indicator may be overlaid over the portion of the enhanced seat view that corresponds to a seat location of the associate. The user device 102 may display the digital indicator on the display device 118 in response to the user device 102 being oriented such that the portion of the enhanced seat view that includes the digital indicator corresponds to the line of sight orientation of the user device 102.

Figure 10:
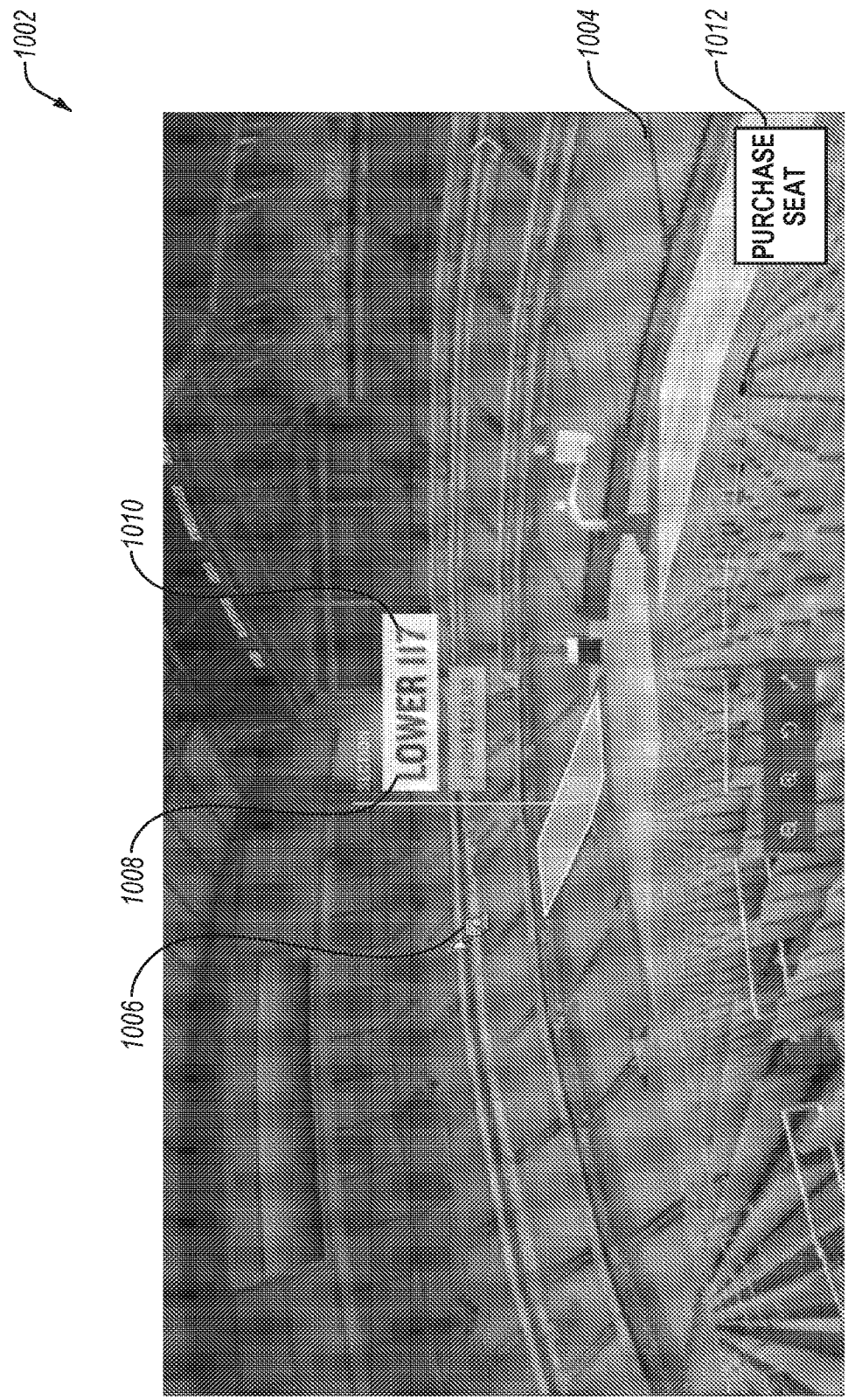
FIG. 10 depicts another screen shot of a portion of another enhanced seat view.

FIG. 10 is a screen shot of a portion 1004 of an enhanced seat view 1002. The portion 1004 of the enhanced seat view 1002 includes an example digital indicator 1006. The digital indicator 1006 includes a small person icon that is within the portion 1004 of the enhanced seat view 1002.

The portion 1004 of the enhanced seat view 1002 also includes another example informational overlay 1008. The informational overlay 1008 includes price information from a seating section 1010 that is within the portion 1004 of the enhanced seat view 1002.

The enhanced seat view 1002 of FIG. 10, which includes the digital indicator 1006, is a panorama digital image. It may be appreciated with the benefit of this disclosure that the digital indicator 1006 may be included in enhanced seat views that include a dual image (e.g., FIGS. 8A and 8B).

Referring to FIG. 2, the system server 140 may communicate a purchase icon 216 to the user device 102. The user device 102 may display the purchase icon 216 on the display device 118. The user device 102 may receive a fourth user input 204D used to select the purchase icon 216. The fourth user input 204D might be communicated to the system server 140. In response to the fourth user input 204D that selects the purchase icon 216, the system server 140 may execute an electronic transaction for an event ticket for the particular event in a selected seating section. In some embodiments, the purchase icon 216 may be overlaid on a portion of the enhanced seat view. In other embodiments, the purchase icon 216 may be included in a list adjacent to or otherwise displayed with the enhanced seat view.

Referring back to FIG. 10, an example purchase icon 1012 is included on the screen shot of the portion 1004 of the enhanced seat view 1002. Selection of the purchase icon 1012 may include the user touching or otherwise providing user input effective to select the purchase icon 1012. In response to the user input that selects the purchase icon 1012, the system server may execute an electronic transaction for an event ticket for the particular event in a selected seating section.

The portion 1004 of the enhanced seat view 1002 also includes another example informational overlay 1008. The informational overlay 1008 includes price information from a seating section 1010 that is within the portion 1004 of the enhanced seat view 1002.

Figure 11A:
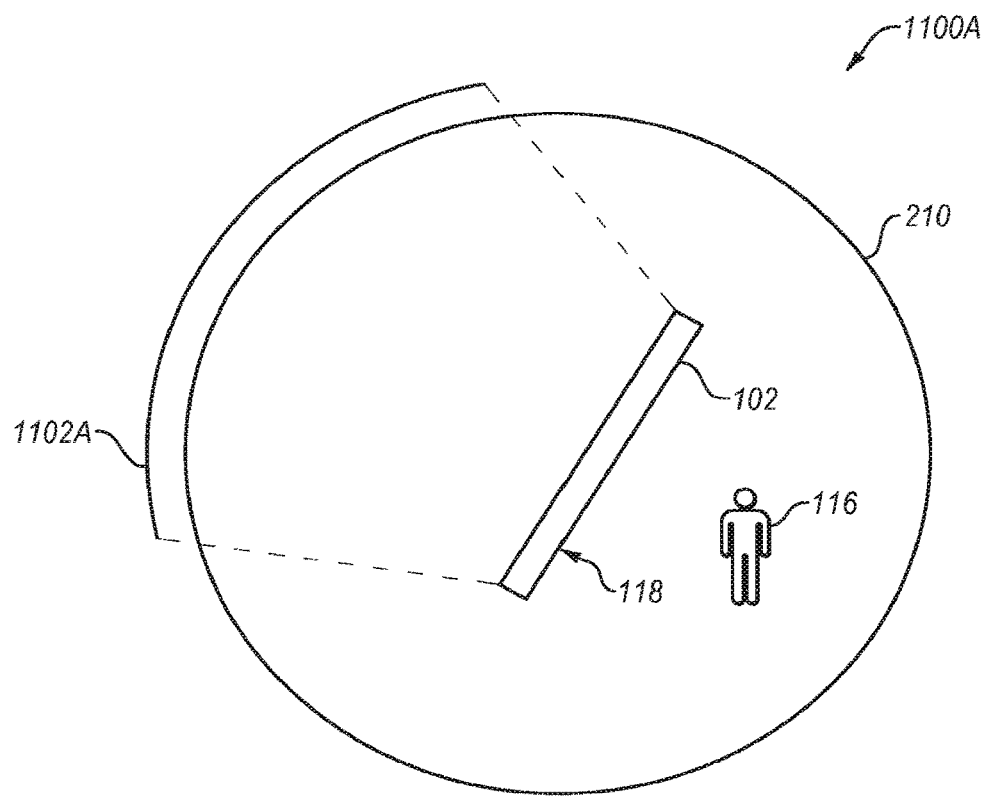
FIGS. 11A and 11B illustrate diagrams of line of sight orientations of a user device.
Figure 11B:
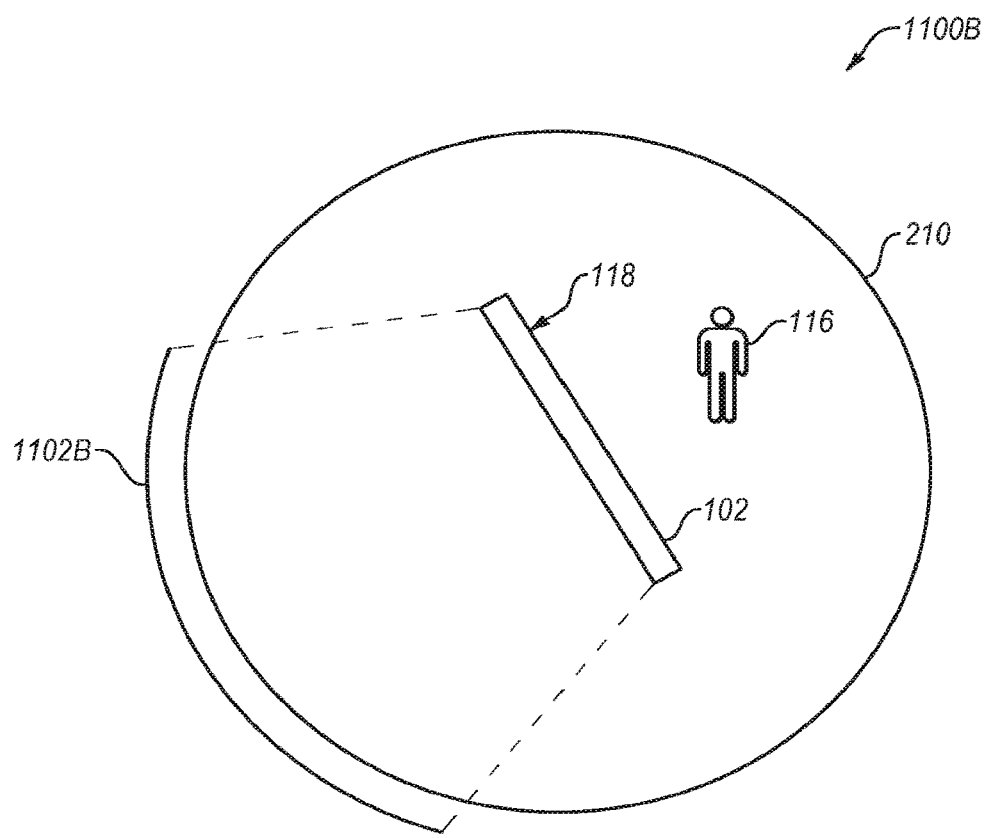

FIGS. 11A and 11B illustrate diagrams of line of sight orientations 1100A and 1100B of the user device 102. In FIGS. 11A and 11B, a top view of the user device 102 is shown. The enhanced seat view 210 may include a 360- degree image. In FIGS. 11A and 11B, the enhanced seat view 210 may be considered fixed.

FIG. 11A depicts a first line of sight orientation 1100A. In the first line of sight orientation 1100A, the user device 102 is in a first angular orientation relative to the user 116. Accordingly, a first portion 1102A of the enhanced seat view 210 may be displayed on the display device 118 of the user device 102.

FIG. 11B depicts a second line of sight orientation 1100B. In the second line of sight orientation 1100B, the user device 102 is in a second angular orientation relative to the user 116. For example, the user device 102 is rotated counter-clockwise in the plane of the page between FIG. 11A and FIG. 11B. Accordingly, a second portion 1102B of the enhanced seat view 210 may be displayed on the display device 118 of the user device 102.

Figure 12:
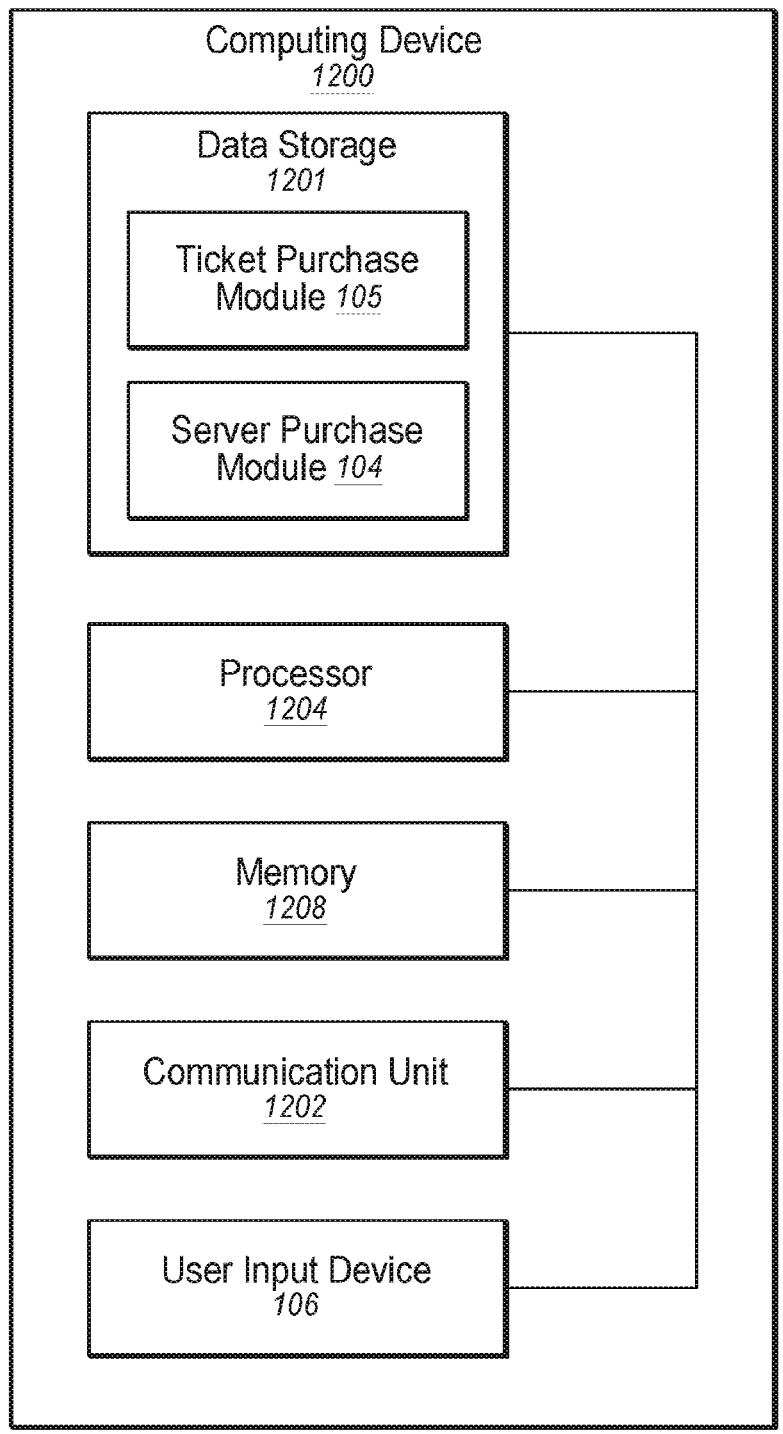
FIG. 12 illustrates an example computing system configured for implementation of an online ticket marketplace interaction or online ticket exchange.

FIG. 12 illustrates an example computing device 1200. The computing device 1200 may be configured for marketplace transactions or online ticket exchanges, arranged in accordance with at least one embodiment described herein. The computing device 1200 may include one or more processors 1204, memory 1208, a communication unit 1202, the user input device 106, and a data storage 1201 that includes the ticket purchase module 105 and the server ticket module 104. Some examples of the computing device 1200 may include the user device 102, the system server 140, the venue server 112, and the social network server 126 discussed elsewhere in the present disclosure.

The processor 1204 may include any suitable special-purpose or general-purpose computer, computing entity, or processing device including various computer hardware or software modules and may be configured to execute instructions stored on any applicable computer-readable storage media. For example, the processor 1204 may include a microprocessor, a microcontroller, a digital signal processor (DSP), an ASIC, an FPGA, or any other digital or analog circuitry configured to interpret and/or to execute program instructions and/or to process data.

Although illustrated as a single processor in FIG. 12, it is understood that the processor 1204 may include any number of processors configured to perform individually or collectively any number of operations described herein. Additionally, one or more of the processors may be present on one or more different electronic devices. In some embodiments, the processor 1204 may interpret and/or execute program instructions and/or process data stored in the memory 1208, the data storage 1201, or the memory 1208 and the data storage 1201. In some embodiments, the processor 1204 may fetch program instructions from the data storage 1201 and load the program instructions in the memory 1208. After the program instructions are loaded into memory 1208, the processor 1204 may execute the program instructions.

The memory 1208 and data storage 1201 may include computer-readable storage media for carrying or having computer-executable instructions or data structures stored thereon. Such computer-readable storage media may include any available media that may be accessed by a general-purpose or special-purpose computer, such as the processor 1204. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 1204 to perform a certain operation or group of operations.

The communication unit 1202 may include one or more pieces of hardware configured to receive and send communications. In some embodiments, the communication unit 1202 may include one or more of an antenna, a wired port, and modulation/demodulation hardware, among other communication hardware devices. In particular, the communication unit 1202 may be configured to receive a communication from outside the computing device 1200 and to present the communication to the processor 1204 or to send a communication from the processor 1204 to another device or network.

The user input device 106 may include one or more pieces of hardware configured to notify a user of the computing device 1200 of a communication, present a communication to a user, or to notify a user of a communication and present the communication to the user. In some embodiments, the user interface may include one or more of a speaker, a microphone, a display, a keyboard, and a touch screen, among other hardware devices. In these and other embodiments, the user input device 106 may also be configured to receive input from a user of the computing device 1200. The user input may include selecting, inputting, or inputting and selecting human base interactive questions, tasks, and user information, such as calendars, communication preferences, or contacts, among other information.

The protection module 1212 may include program instructions stored in the data storage 1201. The processor 1204 may be configured to load the protection module 1212 into the memory 1208 and execute the protection module 1212. When executing the protection module 1212, the processor 1204 may be configured to perform operations of event monitoring as described elsewhere herein.

In view of this disclosure, it will be appreciated that modifications, additions, or omissions may be made to the computing device 1200 without departing from the scope of the present disclosure. For example, in some embodiments, the computing device 1200 may not include the user input device 106. In these and other embodiments, the computing device 1200 may be a server or other computing device or system that monitors for occurrence of monitored events using the communication unit 1202. In some embodiments, the different components of the computing device 1200 may be physically separate and may be communicatively coupled via any suitable mechanism. For example, the data storage 1201 may be part of a storage device that is separate from a server, which includes the processor 1204, the memory 1208, and the communication interface, that is communicatively coupled to the storage device.

As indicated above, the embodiments described herein may include the use of a special purpose or general purpose computer (e.g., the processor 1204 of FIG. 12) including various computer hardware or software modules, as discussed in greater detail below. Further, as indicated above, embodiments described herein may be implemented using computer-readable media (e.g., the memory 1208 of FIG. 12) for carrying or having computer-executable instructions or data structures stored thereon.

Figure 13:
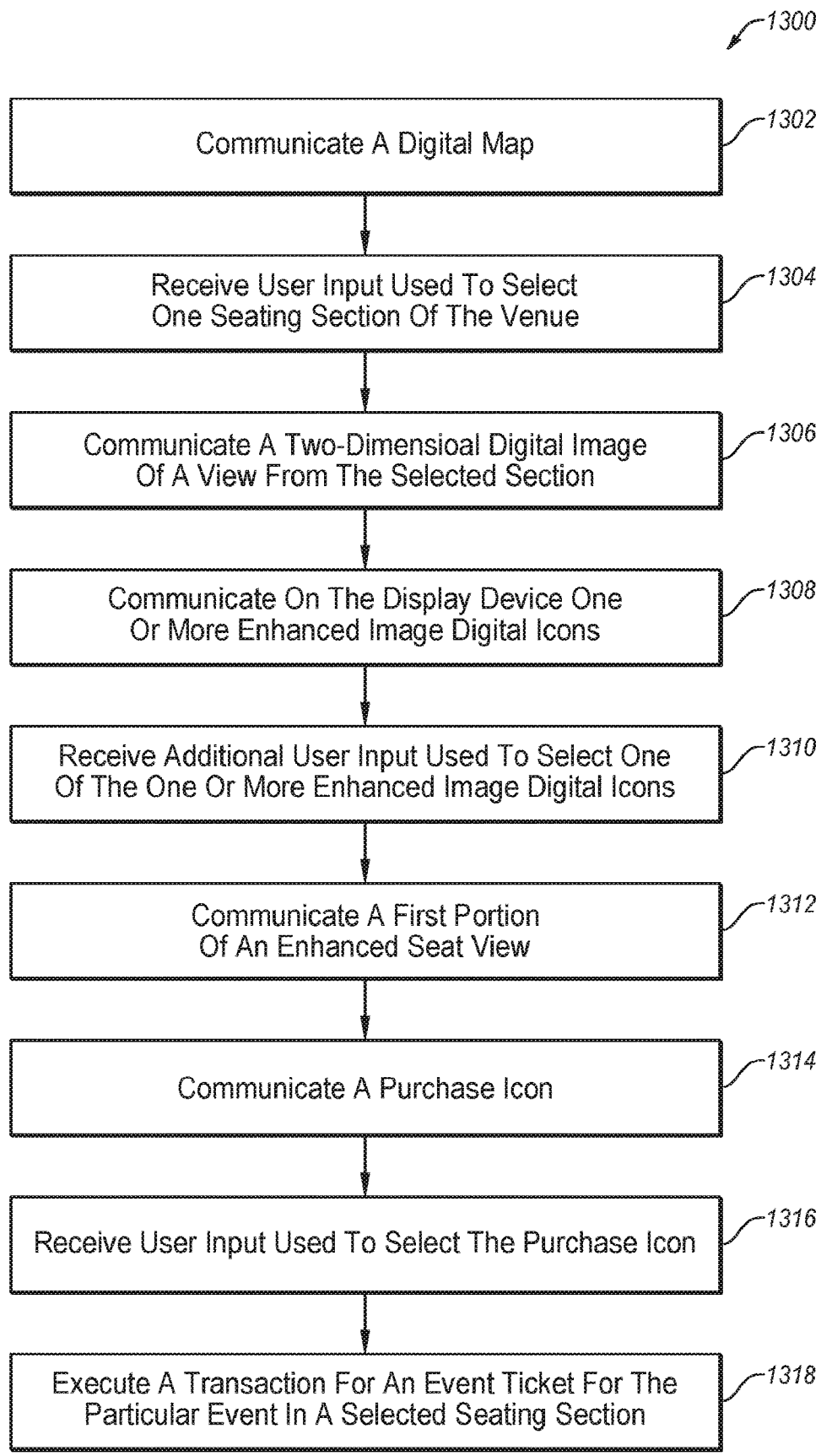
FIG. 13 is a block diagram of an example method of an online ticket exchange.

FIG. 13 is a block diagram of an example method 1300 of online ticket exchange that involves an enhanced seat view. The method 1300 may begin at block 1302 in which a digital map may be communicated to a user device. The digital map may be of a venue. The digital map may depict multiple seating sections of the venue as arranged for a particular event. For instance, the venue as arranged for a particular event may include one or more of a stage location, seating section omissions, and a floor type. The digital map may include an elevation view of the venue. The digital map may include price information of each of the seating sections. The price information may be displayed when a cursor is placed within an icon of the seating section.

At block 1304, user input used to select one seating section of the venue from the seating sections may be received from the user device. At block 1306, a two-dimensional digital image of a view from the selected section may be communicated. The two-dimensional digital image may be communicated in response to the user input that selects the seating section.

At block 1308, one or more enhanced image digital icons may be communicated to the user device. The one or more enhanced image digital icons may include a VR digital icon and/or a panorama digital icon. The enhanced image digital icons may be displayed on the two-dimensional digital image. At block 1310, additional user input used to select one of the one or more enhanced image digital icons may be received.

At block 1312, a first portion of an enhanced seat view may be communicated. The first portion of the enhanced seat view may be communicated to the user device in response to the user input that selects one of the enhanced image digital icons. The enhanced seat view may be consistent with the selected enhanced image digital icons. The enhanced seat view may include a 360-degree interactive view from the selected seating section that is responsive to movement of the user device. The first portion of the enhanced seat view may correspond to a first line of sight orientation of the user device from the selected seating section. The enhanced seat view may include a two-dimensional, panorama digital image. The enhanced seat view may also include a dual image that when viewed by an AR platform results in a three-dimensional image. The enhanced seat view may include a portion of a computer-aided design (CAD) model of the venue and/or actual photographic images of the venue.

At block 1314, a purchase icon may be communicated to a user device. At block 1316, user input used to select the purchase icon may be received from the user device. At block 1318, an electronic transaction for an event ticket for the particular event may be executed. The transaction may be executed in the selected seating section in response to the user input that selects the purchase icon.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

In some embodiments, the method 1300 may include accessing event information for the particular event. A digital overlay may then be generated that includes one or more icons that represent the event information. The digital overlay may be configured such that the icon is positioned on the portion of the enhanced seat view that is relevant to the event information. In these and other embodiments, the method 1300 may include overlaying on the enhanced seat view the digital overlay of the event information. The digital overlay may be overlaid over a portion of the enhanced seat view to which the event information is relevant. For example, the event information may include a ticket price for a second seating section during the particular event. A digital overlay may be generated that includes an icon of the ticket price that is overlaid over the second seating section. Additionally, the event information may include ticket availability for a third seating section during the particular event. The digital overlay may include an icon of the ticket availability overlaid over the third seating section.

Additionally in these and other embodiments, the digital overlay may include a relocation icon associated with a relocation position. The relocation position may include another seating section or another seat, which may be available during the particular event. The relocation position may also correspond to the portion of the enhanced seat view to which the event information is relevant. The method 1300 may include overlaying with the digital overlay that includes the relocation icon on the enhanced seat view. User input used to select the relocation icon may be received. In response to selection of the relocation icon, the method 1300 may include communicating to the user device a second enhanced seat view or a first portion thereof. The second enhanced seat view may include a 360-degree interactive view from a seating section that corresponds to the portion of the enhanced seat view to which the event information is relevant.

In some embodiments, the method 1300 may include accessing social media information of an associate of a user. A seat location of the associate for the particular event may be determined. The method 1300 may include overlaying on the enhanced seat view a digital indicator that corresponds to the associate. The digital indicator may be overlaid over the portion of the enhanced seat view that corresponds to the seat location. The method 1300 may include alerting the user that the associate is attending the particular event.

The method 1300 described with reference to FIG. 13 includes selection of a seating section. In other embodiments, the method 1300 may include selection of a seat. The steps represented in blocks 1302, 1304, 1306, 1308, 1310, 1312, 1314, 1316, 1318, or some combination thereof may be performed substantially as described above except the seat is selected.

Figure 14A:
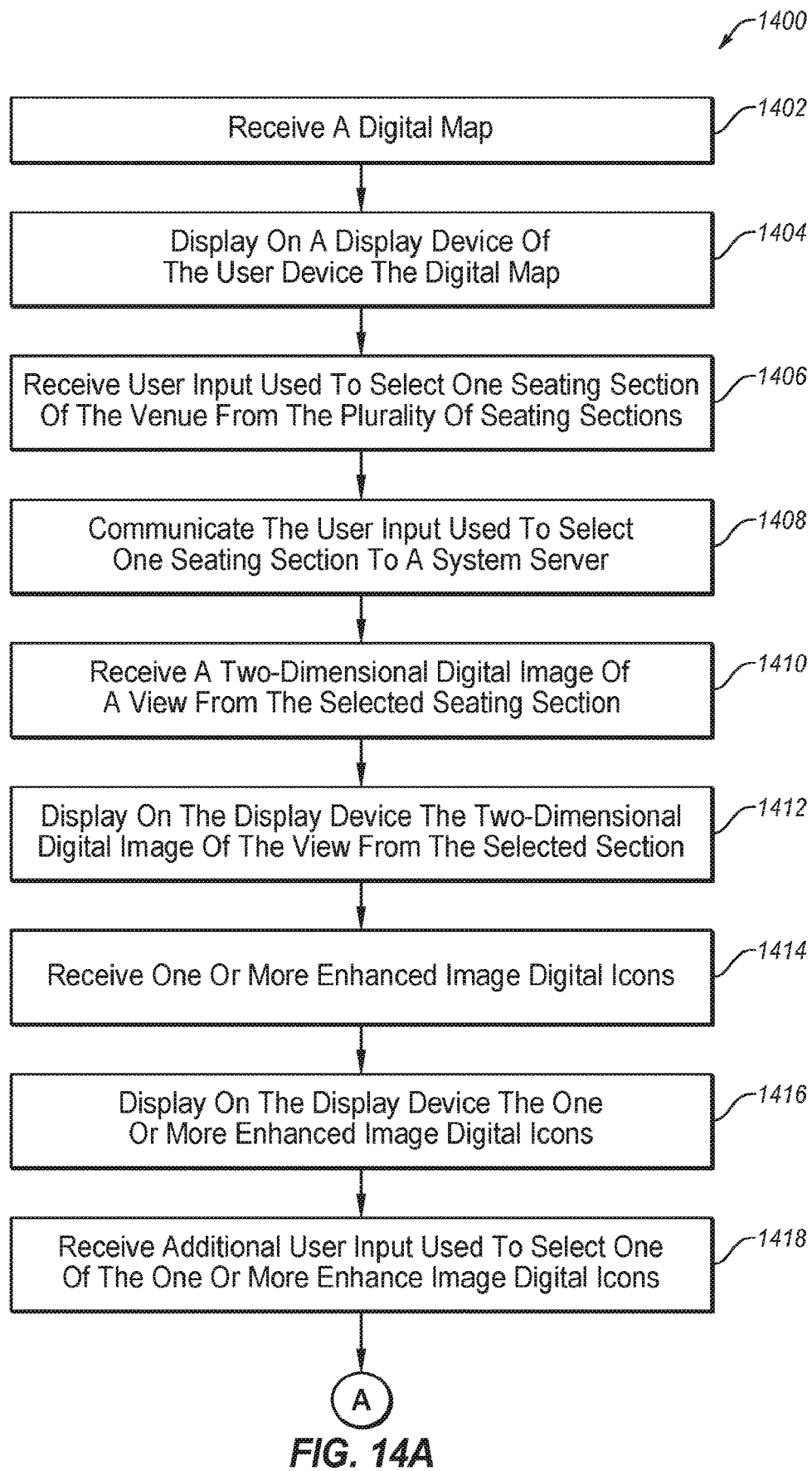
FIGS. 14A and 14B are a block diagram of another example method of an online ticket exchange.
Figure 14B:
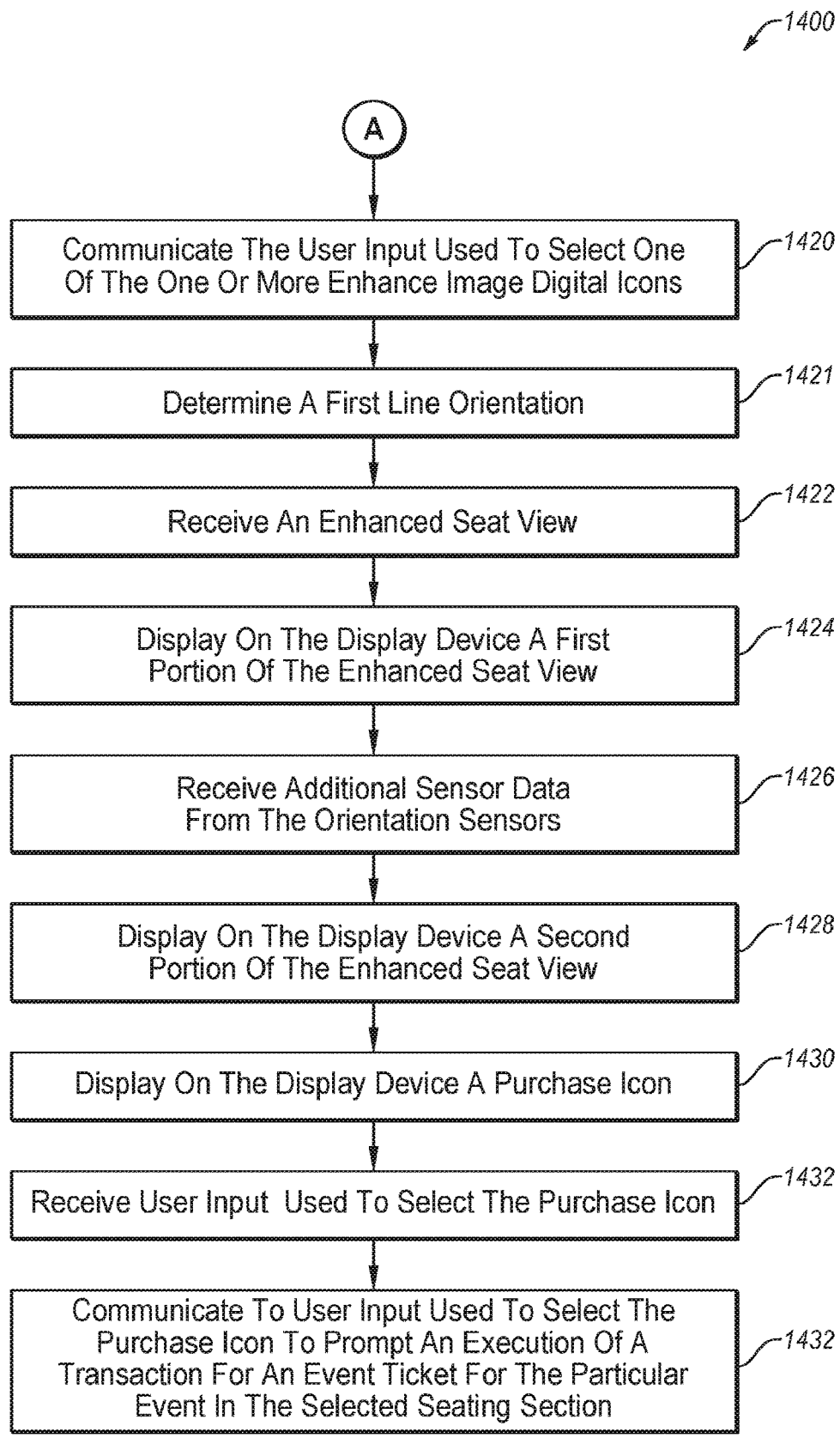

FIGS. 14A and 14B are a block diagram of another example method 1400 of an online ticket exchange that involves an enhanced seat view. With reference to FIG. 14A, the method 1400 may begin at block 1402 in which a digital map may be received. The digital map may be of a venue. The digital map may depict multiple seating sections of the venue as arranged for a particular event. For instance, the venue as arranged for a particular event may include one or more of a stage location, seating section omissions, and a floor type. The digital map may include an elevation view of the venue. The digital map may include price information of some or each of the seating sections. The price information may be displayed when a cursor is placed within an icon of the seating section.

At block 1404, the digital map may be displayed on a display device of the user device. At block 1406, user input used to select one seating section from the seating sections may be received. The user input used to select the seating section may include selecting, using a user input device, one icon representative of one of the seating sections from the digital map. At block 1408, the user input used to select one seating section may be communicated to a system server. At block 1410, a two-dimensional digital image of a view from the selected seating section may be received.

At block 1412, the two-dimensional digital image of the view from the selected section may be displayed on the display device. At block 1414, one or more enhanced image digital icons may be received. The one or more enhanced image digital icons may include a panorama digital icon and a VR digital icon. At block 1416, one or more enhanced image digital icons may be displayed on the display device. The enhanced image digital icons may be displayed on the two-dimensional digital image. At block 1418, additional user input used to select one of the one or more enhanced image digital icons may be received.

Referring to FIG. 14B, at block 1420, the user input used to select one of the one or more enhanced image digital icons may be communicated to the system server. At block 1421, a first line of sight orientation of the user device may be determined. The first line of sight orientation may be determined based on sensor input from one or more orientation devices. At block 1422, an enhanced seat view may be received. The enhanced seat view may be consistent with the selected enhanced image digital icons. The enhanced seat view may include a 360-degree interactive view from the selected section that is responsive to movement of the user device. The enhanced seat view may include a portion of a CAD model of the venue and/or actual photographic images of the venue. The enhanced seat view may include a two-dimensional, panorama digital image. The enhanced seat view may include a dual image that when viewed by an AR platform results in a three-dimensional image.

At block 1424, a first portion of the enhanced seat view may be displayed. The first portion of the enhanced seat view may be displayed in response to receipt of the enhanced seat view. The first portion of the enhanced seat view may correspond to the first line of sight orientation of the user device from the selected seating section.

At block 1426, additional sensor data from the one or more orientation sensors may be received. The sensor data may be indicative of a movement of the user device from the first line of sight orientation to a second line of sight orientation. At block 1428, a second portion of the enhanced seat view may be displayed on the display device. The second portion of the enhanced seat view may correspond to the second line of sight orientation of the user device from the selected seating section.

At block 1430, a purchase icon may be displayed on the display device. At block 1432, user input used to select the purchase icon may be received from the user device. At block 1434, user input used to select the purchase icon may be communicated to the system server. The user input used to select the purchase icon may be communicated to prompt an execution of an electronic transaction for an event ticket for the particular event in the selected seating section.

In some embodiments, the enhanced seat view may include a digital overlay. The digital overlay may include an icon representative of accessed event information. The icon may be overlaid over a portion of the enhanced seat view to which the event information is relevant. In these and other embodiments, the method 1400 may further comprise displaying the digital overlay on the display device in response to the user device being oriented such that the portion of the enhanced seat view that includes the digital overlay corresponds to a line of sight orientation of the user device.

For example, the event information may include a ticket price for a second seating section of the seating sections during the particular event. The icon may accordingly include the ticket price overlaid over the second seating section. The event information may include ticket availability for a third seating section during the particular event. The icon may accordingly include the ticket availability overlaid over the third seating section.

In some embodiments, the digital overlay may include a relocation icon that is associated with a relocation position. In these and other embodiments, the method 1400 may include receiving user input used to select the relocation icon. The method 1400 may include communicating the user input used to select the relocation icon to the system server. The method 1400 may include receiving a second enhanced seat view from the system server and displaying on the display device a first portion of a second enhanced seat view. The first portion of the second enhanced seat view corresponds to a first line of sight orientation of the user device from the relocation position.

In some embodiments, the enhanced seat view includes a digital indicator that corresponds to a seat location of an associate of a user. The digital indicator may be overlaid over the portion of the enhanced seat view that corresponds to the seat location. The method 1400 may include displaying the digital indicator on the display device in response to the user device being oriented such that the portion of the enhanced seat view that includes the digital indicator corresponds to the line of sight orientation of the user device. The method 1400 may include alerting the user that the associate is attending the particular event.

The method 1400 described with reference to FIGS. 14A and 14B includes selection of a seating section. In other embodiments, the method 1400 may include selection of a seat. The steps represented in blocks 1402, 1404, 1406, 1408, 1410, 1412, 1414, 1416, 1418, 1420, 1422, 1424, 1426, 1428, 1430, 1432, 1434, or some combination thereof may be performed substantially as described above except the seat is selected.

Figure 15:
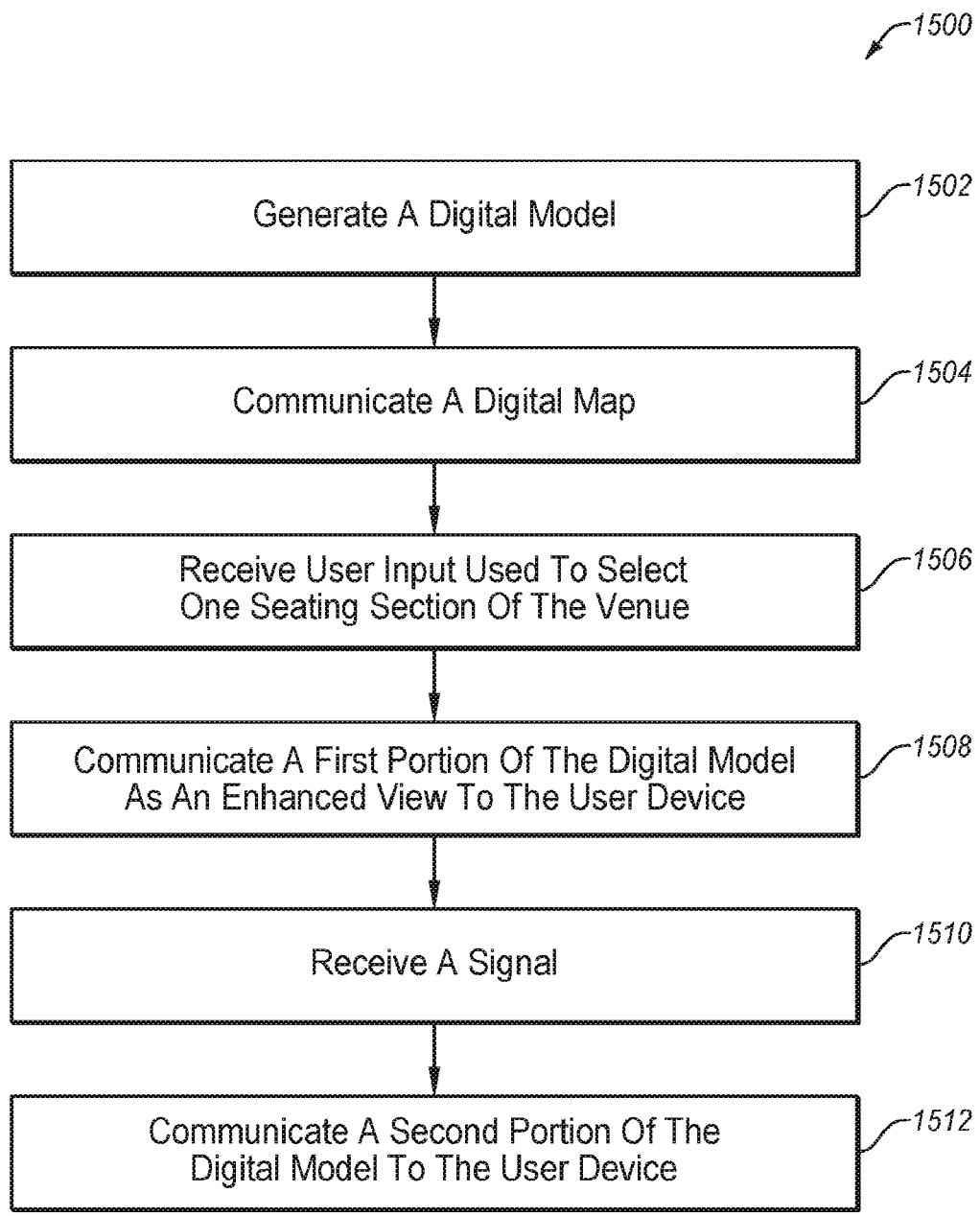
FIG. 15 is a block diagram of an example method of digital model optimization.

FIG. 15 is a block diagram of an example method 1500 of digital model optimization. The method 1500 may begin at block 1502 in which a digital model may be generated. The digital model may be of a venue in some embodiments. Generating the digital model may include stitching together multiple two-dimensional images captured in different directions around a resolution sphere to create three-dimensional model. Additionally, in these and other embodiments, the generating the digital model of the venue may include lighting the digital module using a virtual camera to perceive virtual light. Additionally, in some embodiments, a virtual double fish-eye lens may be used to capture the surroundings by reflecting the surrounding "virtual light" onto a surface of the sphere. The sphere may then be unwrapped to conform to a two-dimensional rectangle. In other embodiments, another process of generating the digital model may be used as described elsewhere in the present disclosure.

In some embodiments, the multiple two-dimensional images include a first image from an up-facing direction, a second image from a front-facing direction, a third image from a back-facing direction, a fourth image from a left-facing direction, a fifth image from a right-facing direction, and a sixth image from a down-facing direction. Additionally or alternatively, in some embodiments, a virtual double fish-eye lens is used to capture the two-dimensional images.

At block 1504, a digital map may be communicated to a user device. The digital map may be of a venue. The digital map may depict multiple seating sections of the venue as arranged for a particular event. For instance, the venue as arranged for a particular event may include one or more of a stage location, seating section omissions, and a floor type.

The digital map may include an elevation view of the venue. The digital map may include price information of each of the seating sections. The price information may be displayed when a cursor is placed within an icon of the seating section.

At block 1506, user input used to select one seating section of the venue from the multiple seating sections may be received from the user device. At block 1508, a first portion of the digital model may be communicated as an enhanced view to the user device. The first portion may correspond to a first line of sight orientation of the user device from the selected seating section as measured by an orientation sensor. At block 1510, a signal may be received. The signal may indicate that sensor data measured by the orientation sensor indicates a movement of the user device from the first line of sight orientation to a second line of sight orientation.

At block 1512, a second portion of the digital model may be communicated to the user device. The second portion of the digital model may be communicated in response to receipt of the indication of the sensor data. The second portion of the digital model may correspond to the second line of sight orientation of the user device from the selected seating section.

In some embodiments, the method 1500 may include communicating to the user device one or more enhanced image digital icons. The enhanced image digital icons may be communicated in response to the user input that selects the seating section. The method 1500 may include receiving additional user input used to select one of the one or more enhanced image digital icons. In these and other embodiments, the one or more enhanced image digital icons may include one or both of a panorama digital icon and a VR digital icon. Additionally, the enhanced seat view may include one or both of a two-dimensional, panorama digital image and a dual image that when viewed by an augmented reality platform results in a three-dimensional image.

In some embodiments, the method 1500 may include accessing event information for the particular event. The event information may be relevant to a particular portion of the venue. The method 1500 may include generating an informational overlay that includes the event information. The informational overlay may include an icon positioned on the particular portion of the enhanced seat view. In these and other embodiments, method 1500 may include overlaying the informational overlay on the enhanced seat view. When overlaid, the icon may be displayed on the user device in response to the user device being oriented such that the portion of the enhanced seat view that includes the informational overlay corresponds to a line of sight orientation of the user device.

The event information may include a ticket price for a second seating section of the seating sections during the particular event and the icon includes the ticket price overlaid over the second seating section. Additionally or alternatively, the event information may include ticket availability for a third seating section of the seating sections during the particular event and the icon includes the ticket availability overlaid over the third seating section.

In some embodiments, the method 1500 may include accessing event information for the particular event. The event information may include a relocation position. The method 1500 may further include generating an informational overlay that includes a relocation icon associated with the relocation position. The informational overlay may include an icon positioned on the particular portion of the enhanced seat view corresponding to the relocation position. The method 1500 may include overlaying the informational overlay on the enhanced seat view, receiving, from the user device, user input used to select the relocation icon and communicating to the user device a third portion of the digital model in response to the user input. The third portion may correspond to a third line of sight orientation from the relocation position in response to selection of the relocation icon.

In some embodiments, the method 1500 may include accessing social media information of an associate of a user and determining a seat location of the associate for the particular event. The method 1500 may include overlaying on the enhanced seat view a digital indicator that corresponds to the associate and alerting a user that the associate is attending the particular event. The digital indicator may be overlaid over the portion of the enhanced seat view that corresponds to the seat location.

In some embodiments, the method 1500 may include communicating a purchase icon to the user device and receiving, from the user device, user input used to select the purchase icon. The method 1500 may include executing an electronic transaction for an event ticket for the particular event in the selected seating section in response to the user input that selects the purchase icon.

The method 1500 described with reference to FIG. 15 includes selection of a seating section. In other embodiments, the method 1500 may include selection of a seat. The steps represented in blocks 1502, 1504, 1506, 1508, 1510, 1512 or some combination thereof may be performed substantially as described above except the seat is selected.

The methods 1300, 1400, and 1500 may be performed in an operating environment such as the operating environment 100 of FIG. 1. The methods 1300, 1400, and 1500 may be programmably performed in some embodiments by the system server 140 or user device 102 described in the present disclosure. In some embodiments, the system server 140, the user device 102, or another computing system may include or may be communicatively coupled to a non-transitory computer-readable medium (e.g., the data storage 1201 or memory 1208 of FIG. 12) having stored thereon programming code or instructions that are executable by one or more processors (such as the processor 1204 of FIG. 12) to cause a computing system of the user device 102, the system server 140, or some combination thereof to perform or control performance of the methods 1300, 1400, and 1500. Additionally or alternatively, the system server 140 and/or the user device 102 may include the processor 1204 described elsewhere in the present disclosure that is configured to execute computer instructions to cause the system server 140, the user device 102, or another computing system to perform or control performance of the methods 1300, 1400, or 1500.

Although illustrated as discrete blocks, various blocks in FIG. 13, FIGS. 14A and 14B, or FIG. 15 may be divided into additional blocks, combined into fewer blocks, or eliminated, depending on the desired implementation.

As used herein, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

The invention claimed is:

1. A system comprising:
 a processor; and
 a memory storing instructions that, when executed by the processor, configure the system to perform operations comprising:
  overlaying an informational overlay over a digital icon positioned on a digital model, the digital model comprising a digital map of a venue and the digital icon comprising at least one seating section;
  receiving an indication from a user to purchase a first ticket at a first location;
  completing the purchase of the first ticket with the user;
  receiving an indication of a relationship between the user and an associate from the user after completing the purchase of the first ticket with the user;
  recording a ticket purchase by the associate based on the relationship after the user purchased the first ticket;
  accessing social media information of the associate of the user from a social network server;
  determining a second location of the associate based on the ticket purchase by the associate in the digital model;
  overlaying on the digital model, a digital indicator onto a portion of the digital model that corresponds to the second location of the associate in the digital model; and
  presenting an option to upgrade to a second ticket at the second location after the first ticket has been purchased.

2. The system of claim 1, wherein the digital model comprises a three-dimensional image and the digital icon comprises a panorama digital icon or a virtual reality (VR) icon.

3. The system of claim 1, wherein the digital map of the venue comprises a stadium, an arena, a theatre, a parking lot, or a fairground.

4. The system of claim 3, wherein the instructions further configure the system to perform operations comprising:
 identifying a region of interest on the digital map of the venue, the region of interest comprising a floor or stage; and
 rendering an elevated view of the venue, the elevated view comprising a display of the digital icon and the at least one seating section arranged relative to the region of interest.

5. The system of claim 4, wherein the instructions further configure the system to perform operations comprising:
 retrieving ticket information associated with the venue; and
 overlaying the ticket information on top of the digital icon.

6. The system of claim 1, wherein the instructions further configure the system to perform operations comprising showing a seat location of the associate of the user.

7. A non-transitory computer-readable storage medium, the computer-readable storage medium including instructions that when executed by a computer, cause the computer to perform operations comprising:
 overlaying an informational overlay over a digital icon positioned on a digital model, the digital model comprising a digital map of a venue and the digital icon comprising at least one seating section;
 receiving an indication from a user to purchase a first ticket at a first location;
 completing the purchase of the first ticket with the user;
 receiving an indication of a relationship between the user and an associate from the user after completing the purchase of the first ticket with the user;
 recording a ticket purchase by the associate based on the relationship after the user purchased the first ticket;

accessing social media information of an associate of a user from a social network server;

determining a second location of the associate based on the ticket purchase by the associate in the digital model;

overlaying on the digital model, a digital indicator onto a portion of the digital model that corresponds to the second location of the associate in the digital model; and presenting an option to upgrade to a second ticket at the second location after the first ticket has been purchased.

8. The non-transitory computer-readable storage medium of claim 7, wherein the digital model comprises a three-dimensional image and the digital icon comprises a panorama digital icon or a virtual reality (VR) icon.

9. The non-transitory computer-readable storage medium of claim 7, wherein the digital map of the venue comprises a stadium, an arena, a theatre, a parking lot, or a fairground.

10. The non-transitory computer-readable storage medium of claim 9, wherein the instructions further cause the computer to perform operations comprising:

identifying a region of interest on the digital map of the venue, the region of interest comprising a floor or stage; and rendering an elevated view of the venue, the elevated view comprising a display of the digital icon and the at least one seating section arranged relative to the region of interest.

11. The non-transitory computer-readable storage medium of claim 10, wherein the instructions further cause the computer to perform operations comprising:

retrieving ticket information associated with the venue; and overlaying the ticket information on top of the digital icon.

12. The non-transitory computer-readable storage medium of claim 7, wherein the instructions further cause the computer to perform operations comprising showing a seat location of the associate of the user.

13. A method, comprising:

overlaying an informational overlay over a digital icon positioned on a digital model, the digital model comprising a digital map of a venue and the digital icon comprising at least one seating section;

receiving an indication from a user to purchase a first ticket at a first location;

completing the purchase of the first ticket with the user;

receiving an indication of a relationship between the user and an associate from the user after completing the purchase of the first ticket with the user;

recording a ticket purchase by the associate based on the relationship after the user purchased the first ticket;

accessing social media information of an associate of a user from a social network server;

determining a second location of the associate based on the ticket purchase by the associate in the digital model;

overlaying on the digital model, a digital indicator onto a portion of the digital model that corresponds to the second location of the associate in the digital model; and presenting an option to upgrade to a second ticket at the second location after the first ticket has been purchased.

14. The method of claim 13, wherein the digital model comprises a three-dimensional image and the digital icon comprises a panorama digital icon or a virtual reality (VR) icon.

15. The method of claim 13, wherein the digital map of the venue comprises a stadium, an arena, a theatre, a parking lot, or a fairground.

16. The method of claim 15, the method further comprising:

identifying a region of interest on the digital map of the venue, the region of interest comprising a floor or stage; and rendering an elevated view of the venue, the elevated view comprising a display of the digital icon and the at least one seating section arranged relative to the region of interest.

17. The method of claim 16, the method further comprising:

retrieving ticket information associated with the venue; and overlaying the ticket information on top of the digital icon.

18. The method of claim 13, the method further comprising showing a seat location of the associate of the user.

* * * * *